US012391524B2

(12) United States Patent
Hall et al.

(10) Patent No.: US 12,391,524 B2
(45) Date of Patent: Aug. 19, 2025

(54) WINCH

(71) Applicant: Hall Labs LLC

(72) Inventors: Michael Hall, Provo, UT (US); Tyler Thomas, Salt Lake City, UT (US); Michael Shinedling, Provo, UT (US); Cody Rees, Ashburn, VA (US)

(73) Assignee: Hall Logic, Inc., Provo, UT (US)

( * ) Notice: Subject to any disclaimer, the term of this patent is extended or adjusted under 35 U.S.C. 154(b) by 187 days.

(21) Appl. No.: 18/050,994

(22) Filed: Oct. 29, 2022

(65) Prior Publication Data

US 2023/0135307 A1 May 4, 2023

Related U.S. Application Data

(60) Provisional application No. 63/273,337, filed on Oct. 29, 2021.

(51) Int. Cl.
*B66D 3/00* (2006.01)
*B66D 3/26* (2006.01)

(52) U.S. Cl.
CPC ........ *B66D 3/26* (2013.01); *B66D 2700/0108* (2013.01); *B66D 2700/0141* (2013.01); *B66D 2700/0191* (2013.01)

(58) Field of Classification Search
CPC ... B66D 3/26; B66D 3/20; B66D 1/14; B66D 1/30; B66D 1/36; B66D 1/48; B66D 1/7405; B66D 1/457; B66D 2700/0191; B66D 2700/0166
See application file for complete search history.

(56) References Cited

U.S. PATENT DOCUMENTS 1,682,083 A * 8/1928 Johnston .............. B66D 1/7405 182/147
2,450,718 A * 10/1948 Darnell .................... B66D 1/26 89/1.51
3,834,673 A * 9/1974 Alexander ............ B66D 1/741 192/14
3,887,164 A * 6/1975 Coombs ............... B66D 1/7405 254/296

(Continued)

FOREIGN PATENT DOCUMENTS

CH 656600 A5 * 7/1986 ............... B66D 1/30
CN 106744426 A * 5/2017 ............... B66D 1/12

(Continued)

*Primary Examiner* — Emmanuel M Marcelo

(57) ABSTRACT

A winch is disclosed having a drive cylinder, configured to be rotated by an applied force about its longitudinal axis and having at least three drive grooves. The winch also includes an idler with a longitudinal axis spaced apart from the longitudinal axis of the drive cylinder. A line is fed onto the winch by passing it over a first of the at least three drive grooves then around the idler and then around a second of the at least three drive grooves. The line is attached to one of a fixed object or the object to be moved. The winch is attached to the other of the fixed object or the object to be moved. As the applied force is applied to the drive cylinder, the line is gripped by the at least three drive grooves and a length of the line between the fixed object and the object to be moved is shortened, whereby the object is moved.

16 Claims, 26 Drawing Sheets

(56) References Cited

U.S. PATENT DOCUMENTS

| | | | | | |
|---|---|---|---|---|---|
| 3,910,559 | A * | 10/1975 | Sapozhnikov | B66D 3/20 242/390.8 |
| 4,065,101 | A * | 12/1977 | Korkut | B66D 1/7405 226/118.1 |
| 4,632,363 | A * | 12/1986 | Frommherz | B66D 1/7405 254/371 |
| 2008/0224111 | A1 * | 9/2008 | Urciuoli | B66D 1/7405 254/266 |
| 2013/0146827 | A1 * | 6/2013 | Serra | B66D 1/7405 254/278 |
| 2021/0037967 | A1 * | 2/2021 | Qiu | A47B 51/00 |
| 2021/0285525 | A1 * | 9/2021 | Hall | B66D 1/36 |
| 2021/0301907 | A1 * | 9/2021 | Hall | B66D 3/18 |

FOREIGN PATENT DOCUMENTS

| | | | | |
|---|---|---|---|---|
| CN | 109231041 | A * | 1/2019 | |
| DE | 19528497 | A1 * | 2/1997 | B66D 1/7405 |
| EP | 1057778 | A2 * | 12/2000 | B66D 1/38 |
| FR | 2734557 | A1 * | 11/1996 | B66D 1/7405 |
| GB | 1475691 | A * | 6/1977 | B66D 1/7405 |
| WO | WO-0010903 | A1 * | 3/2000 | B66D 1/7405 |

* cited by examiner

WINCH

CROSS-REFERENCE TO RELATED APPLICATIONS

This application claims priority to U.S. Provisional Patent Application 63/273,337 titled Capstan Winch and filed Oct. 29, 2021.

TECHNICAL FIELD

This disclosure relates generally to winches.

BACKGROUND

Winches have proven useful tools in moving objects of considerable size and weight. Most winches function by winding or unwinding the line that is coiled around a horizontal rotating drum or spool, thereby pulling a load. Improved winching devices are needed.

SUMMARY

In a first aspect, the disclosure provides a winch having a drive cylinder, configured to be rotated by an applied force about its longitudinal axis and having at least three drive grooves. An idler with a longitudinal axis spaced apart from the longitudinal axis of the drive cylinder. A line is fed onto the winch by passing it over a first of the at least three drive grooves then around the idler and then around a second of the at least three drive grooves and then around the idler and then around a third of the at least three drive grooves. The line is attached to one of a fixed object or the object to be moved. The winch is attached to the other of the fixed object or the object to be moved. As the applied force is applied to the drive cylinder, the line is gripped by the at least three drive grooves and a length of the line between the fixed object and the object to be moved is shortened, whereby the object is moved. Preferably, this aspect includes a rotation control device, which keeps the winch from unwinding during winding, but allows it to unwind when needed.

In a second aspect, the disclosure provides a winch. The winch having a drive cylinder, rotated about its longitudinal axis and having at least three drive grooves rotating in parallel planes that are perpendicular to the longitudinal axis of the drive cylinder. A shaft parallel to the longitudinal axis of the drive cylinder upon which at least two idler pulleys are rotatably attached. The idler pulleys rotate in planes parallel to each other, which planes are at an angle to the parallel planes of the drive grooves, such that, as a line passes around a first drive groove, onto a first idler pulley, and around the first idler pulley, the line, as it comes off the first idler pulley, is aligned with a second drive groove; and wherein as the line comes around the second drive groove, onto a second idler pulley, and around the second idler pulley, the line, as it comes off the second idler pulley, is aligned with a third drive groove. The line is attached to one of a fixed object or an object to be moved. The winch is attached to the other of the fixed object or the object to be moved. As the line is passed around the drive grooves and idler pulleys and as the drive cylinder is rotated, the length of the line between the fixed object and the object to be moved is shortened, thereby moving the object to be moved.

In a third aspect, the disclosure provides a winch kit, including the winch described above along with a winch attachment device comprising a hook or a loop, a line attachment device comprising a hook or a loop, and a handle for manually rotating the drive cylinder.

Further aspects and embodiments are provided in the drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
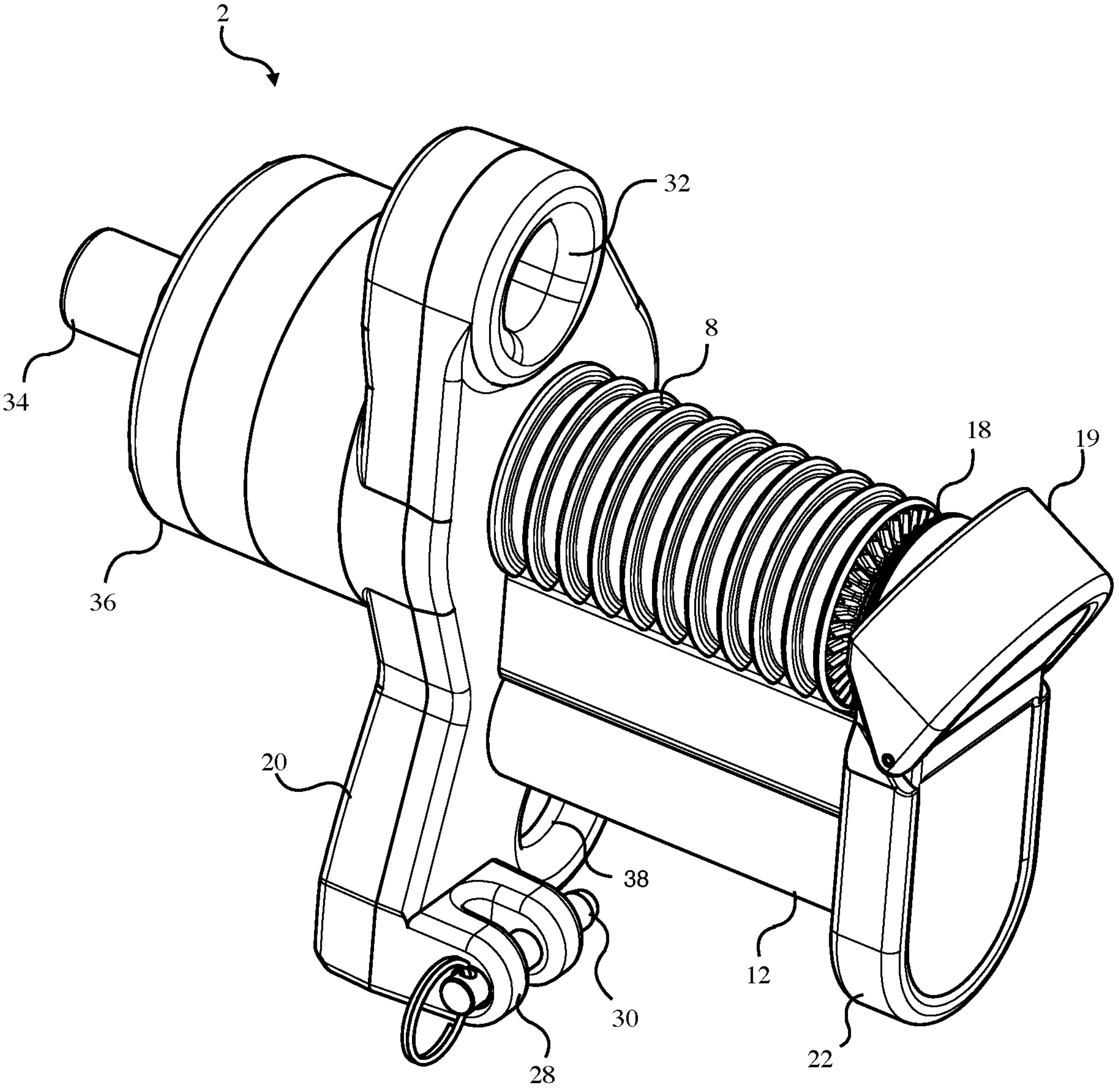
FIG. 1 is a perspective view of the winch without a line attached.
Figure 2:
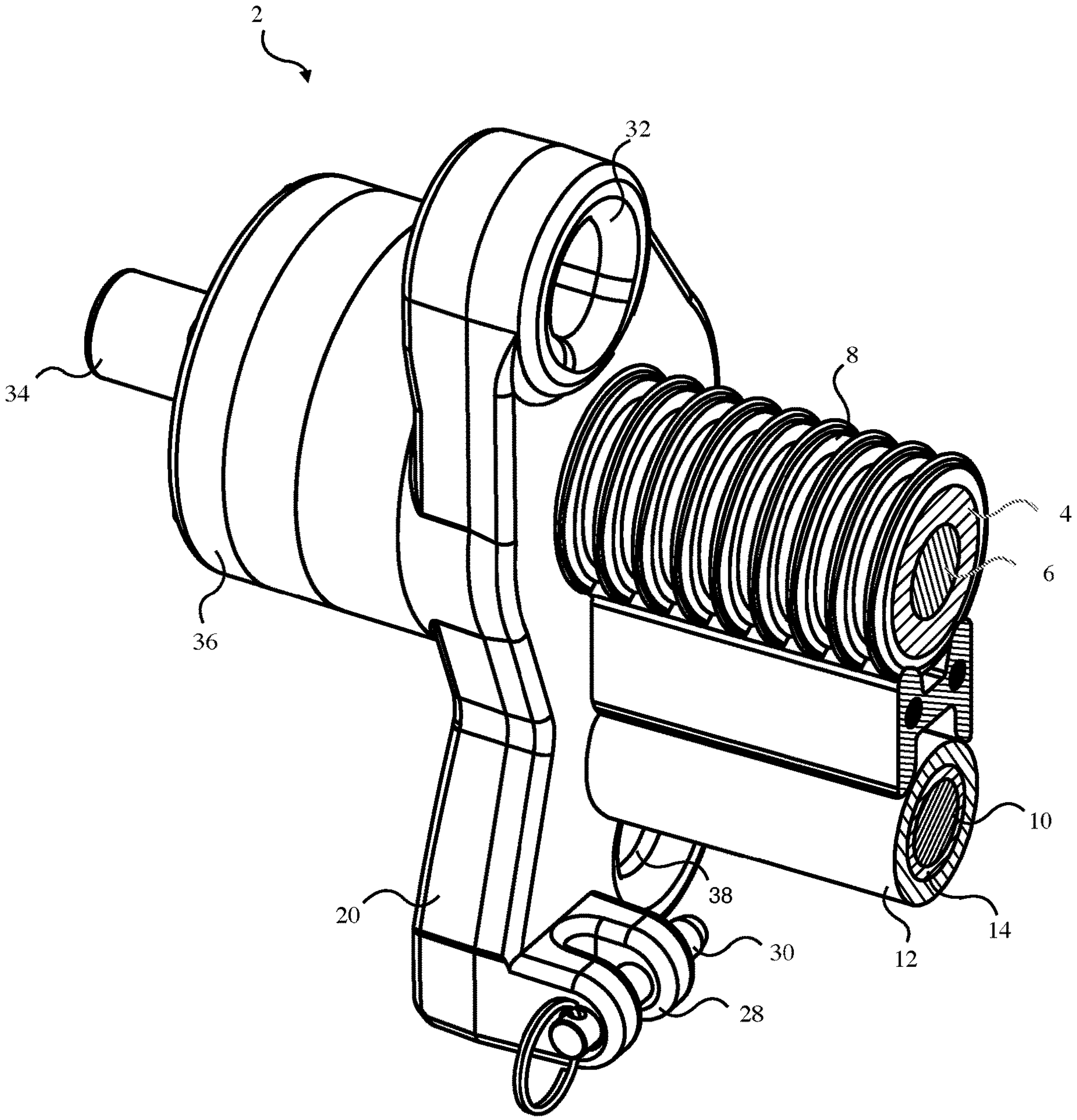
FIG. 2 is perspective view of the winch with a cross section through the drive shaft, drive roller, and idler roller.
Figure 3:
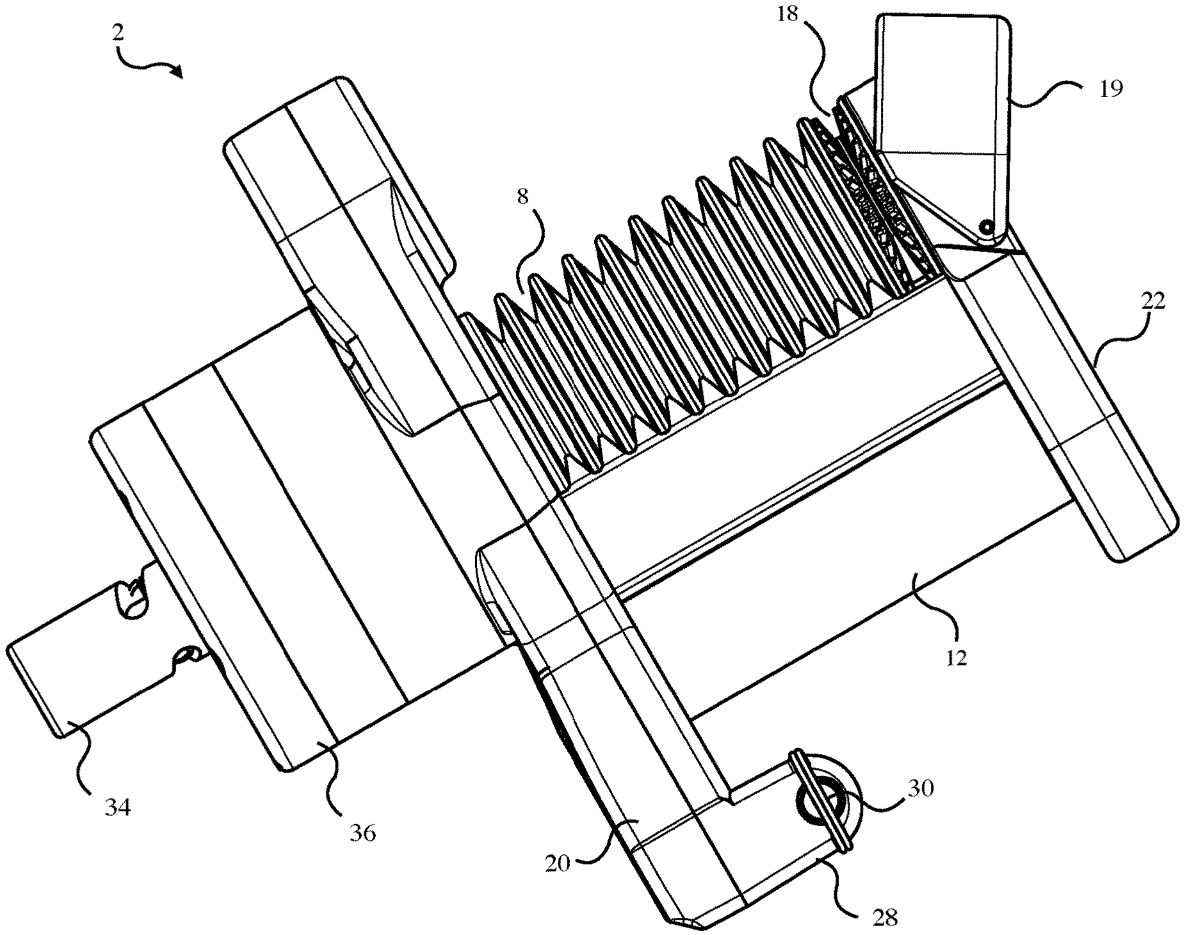
FIG. 3 is a top view of the winch without a line attached.
Figure 4:
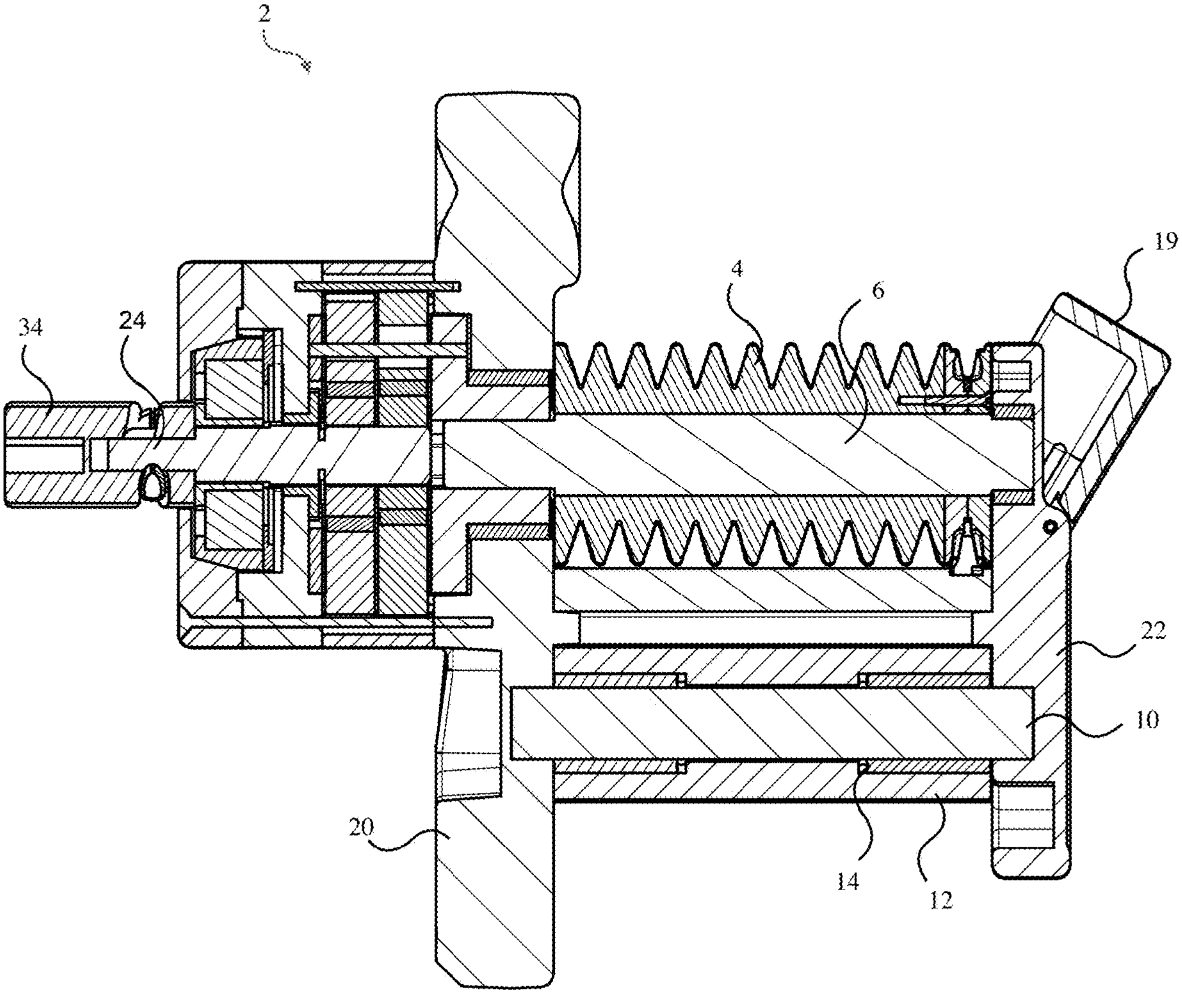
FIG. 4 is a cross section through the longitudinal axis of the winch.
Figure 5:
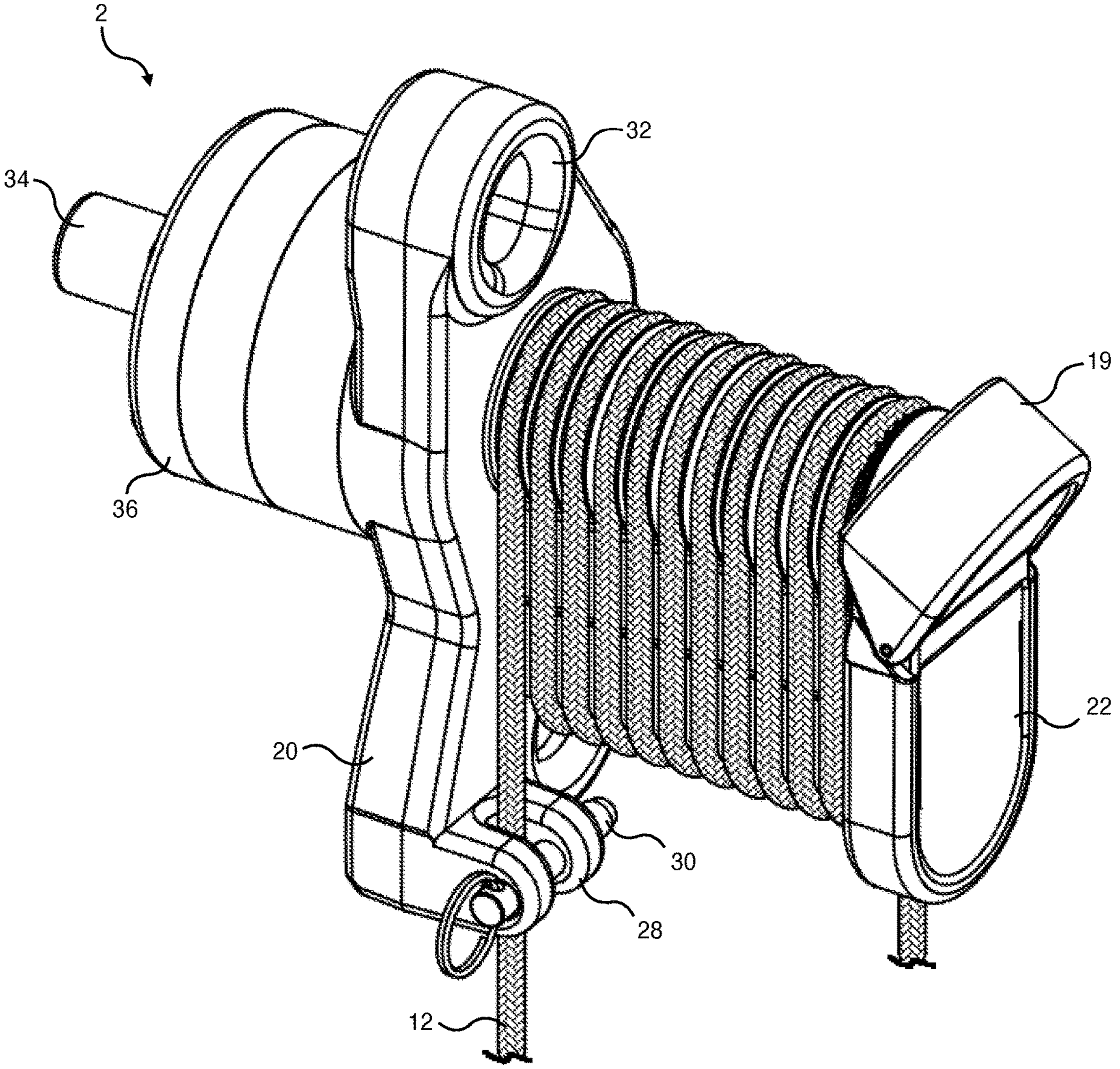
FIG. 5 is a perspective view of the winch including the line threaded through the winch.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms “a,” “an,” and “the” include plural referents unless the context clearly dictates otherwise. For example, reference to “a substituent” encompasses a single substituent as well as two or more substituents, and the like.

As used herein, “for example,” “for instance,” “such as,” or “including” are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, “line” is meant to refer to any device or material that is long, cylindrical, thin, flexible, and having a high tensile strength. Preferably, this will be a braided wire, but ropes, cords, string, twine, cable, strand, chains and combinations thereof may be used as well.

As used herein, “capstan effect” is meant to refer to the small holding force exerted on a line by one side of a cylinder and the line therefore being able to carry a much larger loading force on the other side, as shown in the Capstan equation. Rotation of the cylinder multiplies the applied tension by the friction between the line and the cylinder.

As used herein “self-locking drive” is meant to refer to a worm drive configuration in which the worm wheel cannot drive the worm. For a worm drive to be self-locking depends on the lead angle, the pressure angle, and the coefficient of friction. Larger reduction ratios involve greater friction between the worm and the worm wheel. Self-locking drives also do not allow reversing the direction of transmission. Single-start, or one spiral worms are especially proficient at not permitting the transmission to reverse direction. This also prevents the output from driving the input. A multi-start worm or a worm that has multiple spirals, reduces the ratio, the braking effect of the worm and worm wheel will need to be discounted, and the wheel may be able to drive the worm.

As used herein “start” is meant to refer to the equivalent number of teeth of a toothed wheel. On a worm, the teeth wrap around the worm. Thus, the number of starts is equivalent to the number of teeth on a toothed wheel.

As used herein “ratchet” is meant to refer to a device with a set of angled teeth in which a cog or tooth engages, allowing motion in one direction only. A ratchet is generally made up of a round gear with teeth or in some instances a linear rack, and a pivoting, spring-loaded pawl that engages the teeth. The teeth are uniform but asymmetrical, with each tooth having a moderate slope on one edge and a much steeper slope on the other edge. When the teeth are moving in the forward or unrestricted direction, the pawl easily slides up and over the gently sloped edges of the teeth, with a spring forcing it into the space between the teeth as it passes over the tip of each tooth. When the teeth move in the backward restricted direction, however, the pawl will catch against the steeply sloped edge of the first tooth it encounters. As the pawl catches the tooth, it locks the pawl against the tooth and prevents any further motion in that direction.

Capstan devices are used to lift and pull objects, but typical capstan devices have some limitations. The line wrapping around the drum overlaps or rubs against itself. The line naturally would exit and enter typical capstan devices at whatever location the line comes off the drum. These and other limitations are overcome in the present invention. The present invention is a capstan effect device, often utilized in recovery of vehicles, sometimes referred to as rescue winch, that uses both a drive cylinder and a line-transitioning idler, idler roller, or set of idler pulleys. The drive cylinder has drive grooves perpendicular to the long axis of the drive cylinder. The roller or idler pulleys are on a shaft that is parallel to the drive cylinder. However, in embodiments with idler pulleys, the idler pulleys rotate at an angle around the drive shaft that allows the grooves of the idler pulleys to align with neighboring drive grooves. This allows the line to pass onto the drive groove, around an idler pulley, and from the idler pulley onto a next adjacent drive groove. The line therefore winds back and forth between the drive grooves, the idler pulleys, and the next drive groove. One end of the line is placed under tension and the other is attached to an object or to a fixed member. The drive cylinder is then driven, and the capstan effect is utilized to move the line through the device, or to move the device along the line, respectively. The line thereby always exits and enters the system at the same place—the ends of the drum, eliminating one difficulty. Further, the line does not overlap and rub on itself, eliminating this friction damage to the line. Neither end of the line is affixed to the drive cylinder. A typical winch would have one end of the line attached to the drum of the winch. With neither end of the line affixed to the capstan winch the line can be attached at any point to an object, thus the capstan winch can be positioned so as to pull the object in the most beneficial direction. Additionally, the capstan winch is attachable at any point along the line. A long line can be carried with the capstan winch and the capstan winch can be attached at any point along the line. Preferably, the line is up to 50 feet in length, more preferably, up to 100 feet in length. The requirement of the line is that has the tensile strength to pull the movable object and the flexibility to wrap around the drive grooves and roller or idler pulleys in the winch.

In a primary embodiment, as seen in FIGS. 1-5, a capstan winch 2 includes a drive cylinder 4 which rotates, about its longitudinal axis, on a drive shaft 6. The drive cylinder 4 has drive grooves, such as drive groove 8, that are parallel to one another and perpendicular to the long axis of the drive shaft 6 and drive cylinder 4. Parallel to the longitudinal axis of drive shaft 6 is an idler shaft 10 on which an idler roller 12 rotates. Between the idler shaft 10 and the idler roller are idler bearings 14 the bearings decrease the friction on the roller and assist in the roller being free spinning. As the idler roller 12 rotates, the line aligns with a second of the drive grooves. This continues across the drive cylinder 4, with each drive groove, being fed line 16 from the roller. The wrapping and tension of the line from the drive cylinder and the idler roller produces a capstan effect on the line 16, reducing the force required to turn the drive cylinder 4 and draw the line in, pulling the object. Turning the drive cylinder 4 counterclockwise causes the line to be drawn out.

The surface of the grooves is preferably designed to provide the right balance between friction and wear on the line. In other words, the total surface of the grooves that engages the line need to have enough friction, i.e., grip, with the line so that the line can be pulled by rotation of the drive cylinder. Likewise, the surface of the grooves should not have so much friction, e.g., roughness, so that the line wears unnecessarily as it is passed over the grooves repeatedly.

The more grooves and the larger the area of contact between the grooves and the line means that each groove needs less friction. In some embodiments, there are three drive grooves. In other embodiments, there are two drive grooves. In a preferred embodiment, there are at least five grooves. In a more preferred embodiment, as in FIGS. 1-5, there are at least 11 grooves. The fewer the grooves, the greater the friction required on the surface of the drive grooves or force supplied by another tensioning device. The surface of the grooves can be tailored with special coatings, such as a soft polymeric coating, e.g., urethane or rubber, that would provide a better grip on the line. Alternatively, the surface of the grooves can be roughened, for example by etching, abrading or the like. Also, the outer surface of the line itself may be tailored with polymers coatings and the like, to provide more grip on the rollers.

In some embodiments, one of the drive grooves includes line gripping additions. As seen in FIGS. 1-5, the final drive groove 18 is ribbed to provide more grip on the line. As depicted by FIGS. 1-5, this is the drive groove furthest to the right, or furthest from the drive mechanism. This drive groove is referred to as the final drive groove because it is the final groove as the line is wound onto the winch to pull the end of the line toward the winch. The grip of this final drive groove assists in starting the line winding in. The ribs extend from the center of the drive groove to the edge of the drive groove. The ribs grip the line. In some embodiments, the ribs of the drive groove mirror each other. In these embodiments, the ribs on one side of the drive groove align with the ribs on the other side of the drive groove.

A line hood 19 opens to allow the line to be looped over the ribbed final drive groove 18. When ready to begin pulling the line 16 to the winch, the line hood is folded into place keeping the line in contact with the ribbed final drive groove 18. The line hood can be seen folded into place in FIGS. 6 and 7. Without the line hood the line could come loose and not remain in place on the final drive groove 18.

The winch includes frame elements to hold the drive shaft 6 and idler shaft 10. A first frame element 20, holds a first end of the drive shaft 6 and idler shaft 10. A second frame element 22 holds a second end of the drive shaft 6 and a second end of the idler shaft 10. The drive shaft 6 passes through first frame element 20 and connects to drive mechanism 24. Drive mechanism 24 connects to input sleeve 34. The input sleeve 34 is designed to enable a handle to connect to the input sleeve 34 and turn the drive mechanism 24 and thus the drive shaft.

First frame element 20 includes a line guide 28. The line guide 28 holds the line in place. The line guide 28 ensures that the line is spooled onto the first drive groove of the drive cylinder. In addition to directing the line onto the first drive groove, the line guide assists in keeping the winch properly aligned as it pulls one end of the line toward the winch. The line guide ensures that the which will not rotate as the line is spooled onto the drive cylinder. In some embodiments, the line guide is machined separately from the frame element. In these embodiments, the line guide is then attached to the frame element. Any one of multiple attachment methods are used to connect the line guide to the frame element and include welding the line guide to the frame element, bolting the line guide to the frame element, and bolting through the frame element. In other embodiments, the line guide is integral to the first frame element. In some embodiments, the line guide is formed by two protrusions from the first frame element. The first frame element, and the protrusions form sides of the line guide. This leaves an open side through which the line can be placed in the line guide. In some embodiments the open side of the line guide is closed by inserting a pin 30 through the two protrusions. By inserting pin 30 through the two protrusions an aperture is formed, through which the line can pass. Because the pin 30 is removable, the line does not have to be threaded through the line guide 28. By removing the pin 30 from one side of the line guide 28, the line can be placed into the line guide 30 at any point along the line. This enables the line to be wound onto the winch by looping the line around the drive cylinder 4 and the idler roller 12. As long as the line is placed in the drive grooves 8 without the line crossing between two grooves, the line will feed from one drive groove to the next. This is true even if the line initially crosses over itself on the idler roller. The line need not pass over every drive groove. It is possible for the winch to function without the line passing over every drive groove. The more drive grooves used the larger the force multiplied to pull an object. Each drive groove is essentially a pulley, so each drive groove used increases the force on the end of the line.

The first frame element also includes a first attachment aperture 32 which is used to attach the winch to an object. In some embodiments, the first attachment aperture 32 is integral to the first frame element. In some embodiments, the first frame aperture 32 is located opposite the line guide. Most often the winch is attached to a stationary object that would be difficult to move. Examples of such objects include trees, vehicles, or other large objects. The attachment aperture 32 allows a rope, carabiner, quick link, loop or other securing device to pass through the first frame element and secure it to the stationary object. By placing the attachment aperture within the first frame element a strong place through which to secure the winch is created. By placing an attachment aperture through the frame, a user will not attempt to attach the winch using another part of the winch, which could damage the winch or interfere with proper use of the winch. The aperture is also through the strongest part of the winch which leads to a longer functional life of the winch. The aperture is sized to enable a number of securing options, including rope loops, straps, chains or other securing methods. The positioning of the first frame aperture and the line guide decreases the possibility of the stationary object or the securing device interfering with the line spooling onto the winch. In some embodiments, a second attachment aperture 38 is located in the first frame element.

The frame elements need to be strong enough to withstand the forces placed on them. Those forces include the weight of all the mechanisms attached to the frame elements, the pulling force of the line, the force of the securing device, the compressive forces of the loops of the line on the attachments from the drive and roller shafts. In order to withstand these forces, the frame elements are constructed of materials that will hold up to these demands. In some embodiments, the frame elements are constructed of steel. In some of these embodiments the steel is steel plate that is from half an inch thick to one inch thick. In some embodiments, the frame elements are constructed of machined steel. The machined steel is from half an inch thick to one and a half inches thick and is machined so that differing areas of the frame have strengthening portions and lightening portions. In another embodiment, the frame elements are constructed of other metals such as aluminum, anodized aluminum, titanium, magnesium, and alloys of any of these metals. In some embodiments, the frame elements are constructed of carbon fiber. In some other embodiments, the frame elements are constructed of combinations of a metal and carbon fiber.

The drive mechanism 36 includes gears for increasing the force imparted to the winch through the input sleeve. The gears are designed to enable a user to turn the input sleeve and thus turn the drive cylinder. Any number of gears can be used in the winch. In some embodiments, the gears are spur gears. In some embodiments, the gears are worm gears. In other embodiments, the gears are planetary gears. In embodiments with planetary gears, the gears are cycloid gears. Cycloid gears are advantageous in situations where high torque is required, and low speeds are acceptable. Cycloid gears are quite efficient, with single stage gears reaching over ninety percent efficiency.

Figure 6A:
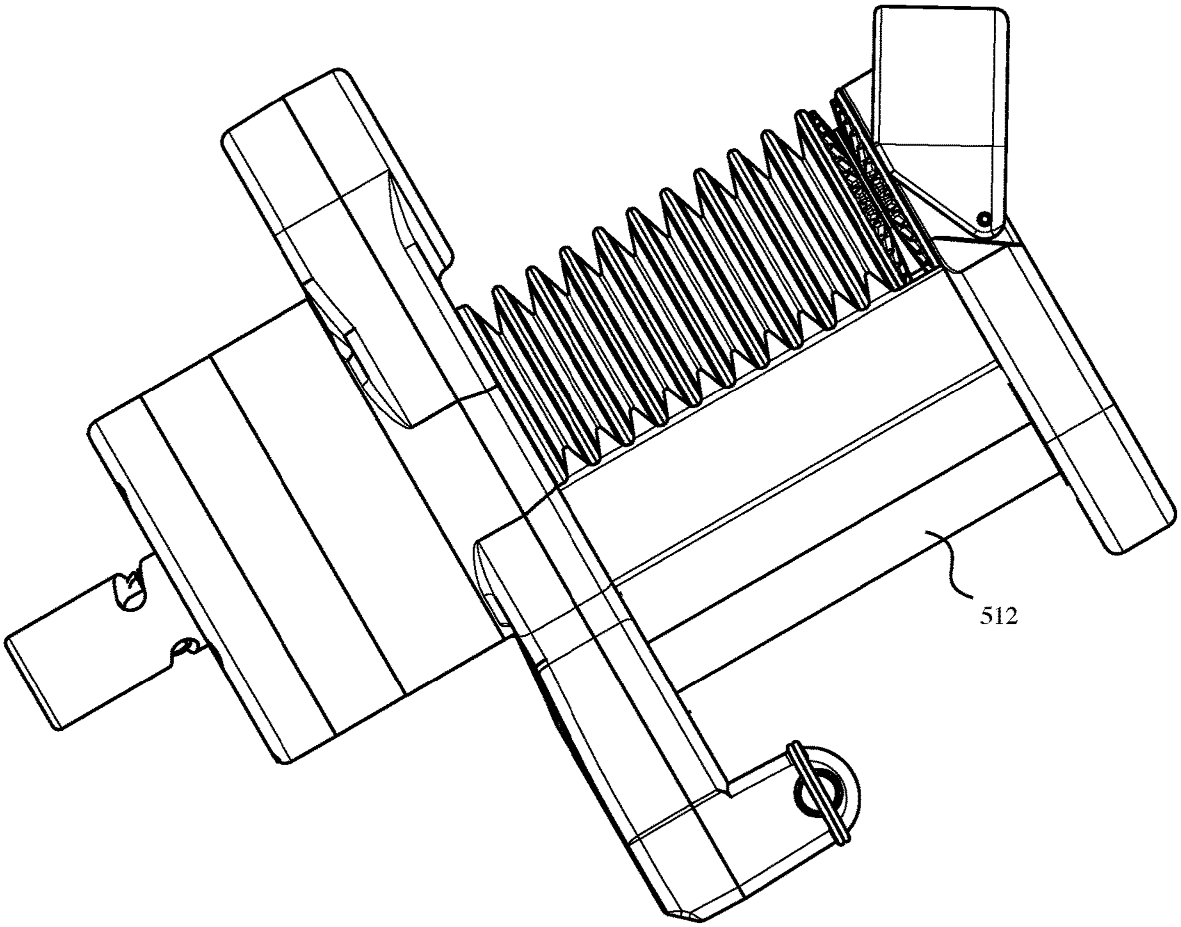
FIG. 6*a* is a perspective view of a winch with an idler
Figure 6B:
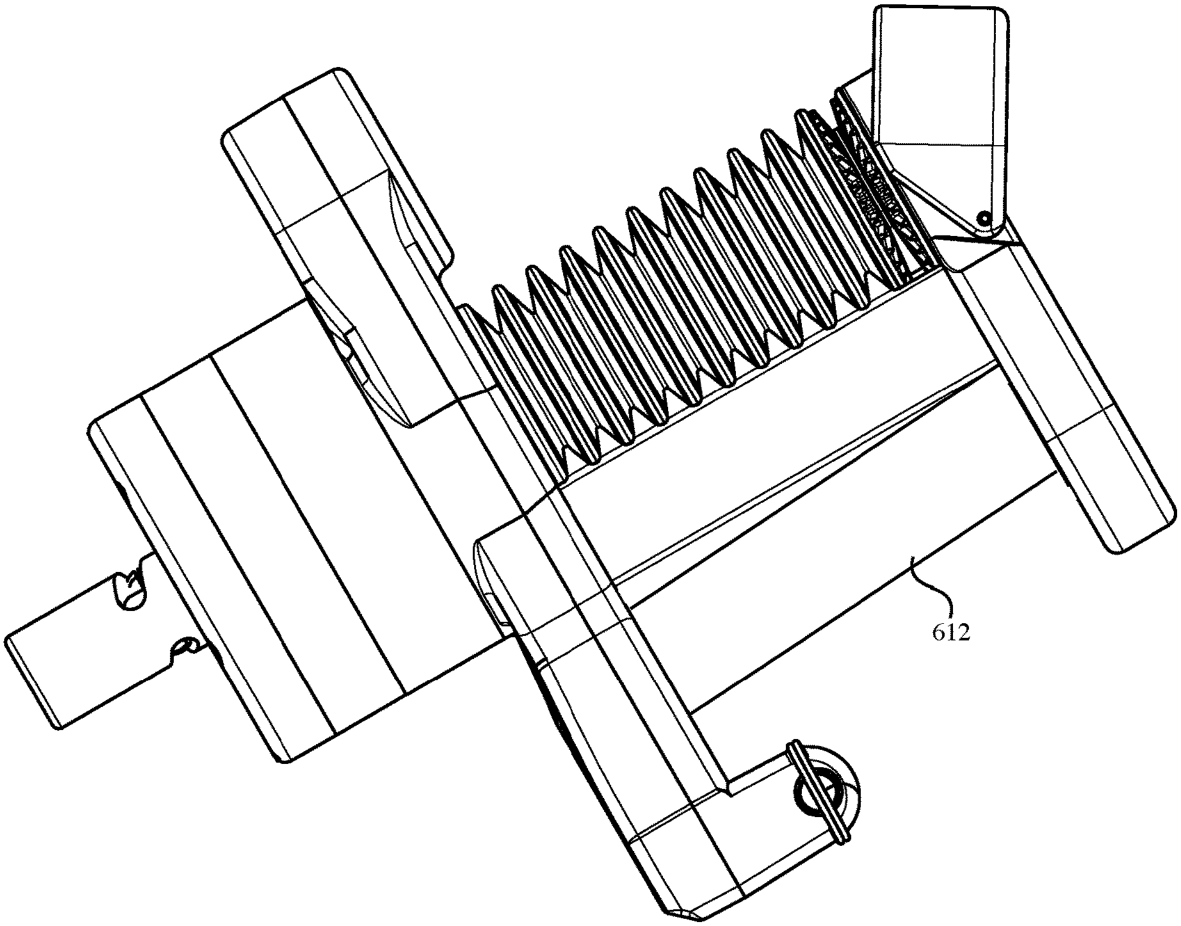
FIG. 6*b* is a perspective view of a winch with a tilted roller

FIGS. 6*a* and 6*b* illustrate alternative configurations of the idler portion of the winch. FIG. 6*a* depicts an idler 512, that is a shaft. The shaft is a smooth cylinder that the line can rotate around. There are no moving parts, so the idler is less likely to have any issues with binding due to dirt or other contaminants. In this embodiment, the idler needs to be made from a material that is strong enough to resist the force produced by the line as it wraps around the idler. The stronger the material the thinner the diameter of the idler can be. In some embodiments, the idler is made from a metal. Such metals include steel, stainless steel, titanium, aluminum, and alloys of these metals.

FIG. 6*b* depicts a tilted idler roller 612. The tilted idler roller 612 is biased toward one side of the winch. As the line loops around the drive grooves onto the tilted roller 612 and to the next drive groove, the tilted aspect of the roller pushes the line along the roller, which helps to align the line with the next drive groove. The tilted roller 612 assists the line in aligning with the next drive groove, creating a smoother interaction between the line and the capstan winch.

Figure 7A:
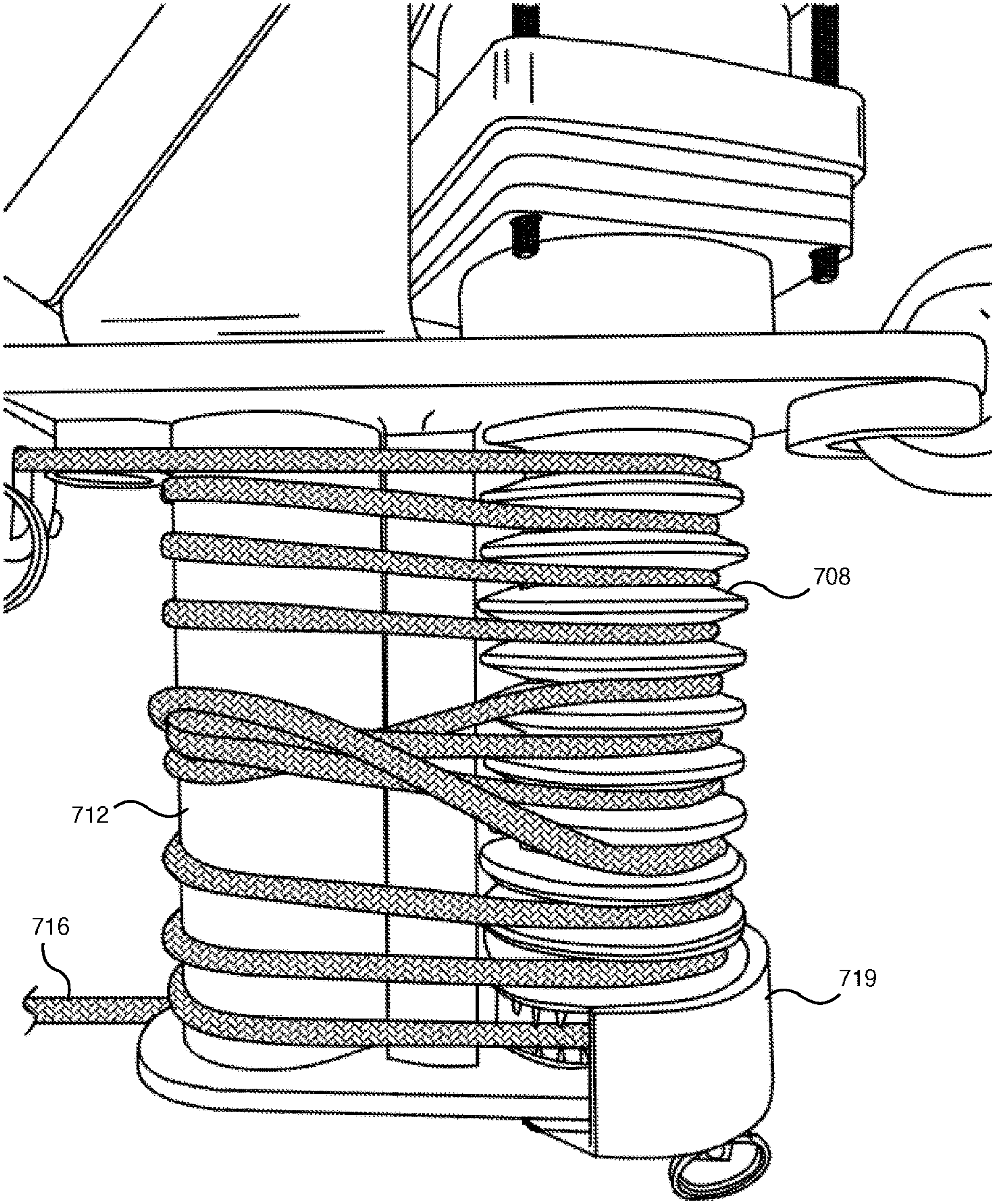
FIG. 7*a* is a view of the winch with line attached, where some of the loops of the line are looped over other loops of the line.
Figure 7B:
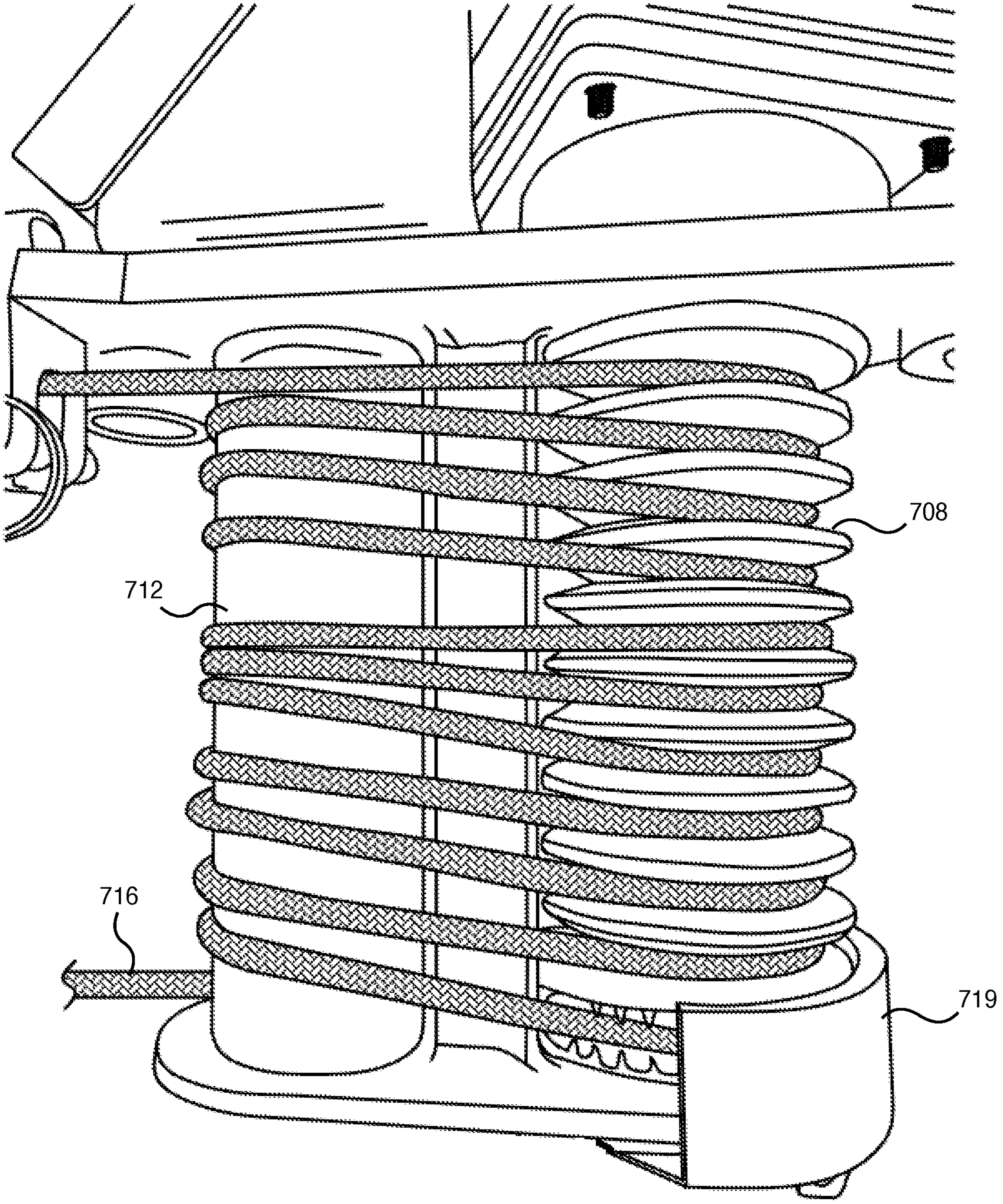
FIG. 7*b* is a view of the winch where the loops of the line have aligned themselves with the guide rollers.

Referring now to FIGS. 7*a* and 7*b*, to use the winch the line is looped over the drive grooves, such as drive groove 708, and idler roller 712. The line may be looped over some of the drive grooves or, as depicted in FIGS. 7*a* and 7*b*, the line may be looped over all the drive grooves. To move through the winch, and pull an object to the winch, the line moves around the first drive groove, then around the idler roller, and then up to the second drive roller. The line progresses across the drive grooves in this same manner, going from drive groove to idler roller to the next drive groove until the line passes out of the winch. In some instances, the speed at which the winch can be used is important to the success of the operation using the winch. This may be because a vehicle is in a precarious position and needs to be extricated before being permanently lost. The winch enables a line to be quickly looped onto the drive grooves, such as drive groove 708 and idler roller 712. If the line 716 is not perfectly aligned on the idler roller 712 the winch will still function. One or several loops rolling over another loop, or each other, will be straightened as the line 716 is rolled through the winch. This can be seen in FIG. 7*a*, where some loops have been looped over other loops. As the drive cylinder and the drive grooves, such as drive groove 708, are rotated, the line 716 on the idler roller 712 is straightened so that the line 716 aligns with the drive grooves, as seen in FIG. 7*b*. This line straightening works so long as the line is correctly looped over the drive grooves. That is, the line 716 progresses from one drive groove to the next. If the line reverses the progression or skips a drive groove and then goes back to the skipped drive groove, the line will bind.

Figure 8:
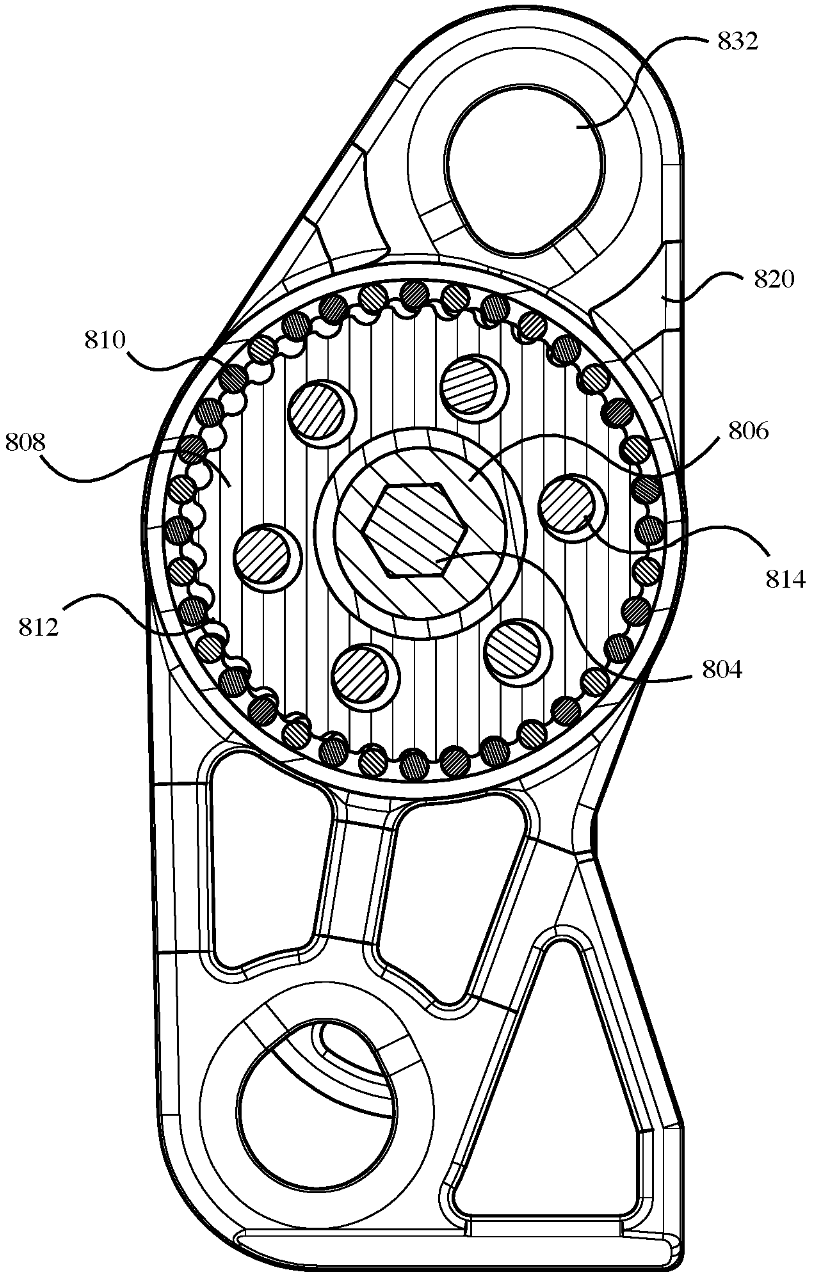
FIG. 8 is a cross section view of a cycloid gear mechanism which assists in driving the winch.

FIG. 8 is a cut-away view of the drive mechanism with a cycloid gear. Input shaft 804 is eccentrically mounted in bearing 806. This causes the cycloidal disc 808 to wobble in a circle. The cycloidal disc 808 rotates around the bearing as it pushes against the ring gear. The ring gear is comprised of gear pins such as gear pin 810. The cycloid disc 808 has disc teeth, such as disc tooth 812, which fit between the gear pins to interact with the gear pins. There are less disc teeth than gear pins. As the cycloid disc rotates it causes the output pins such as output pin 814 to rotate. The rotation of the output pins causes the output shaft to rotate.

In addition to the gears, the drive mechanism includes a device to control the rotation of the drive shaft. It is important to control the drive shaft for safety and to minimize the amount of work necessary to pull an object toward the winch. Without a means to control the rotation of the drive shaft, the user may be required to hold the handle in such a way as to stop the drive shaft from rotating. Relying on the user to control rotation with the handle is not safe as the force could change and pull the line away from the winch.

The rotation control device includes a brake housing and a brake pad. The brake pad is cone shaped, and the brake housing has a corresponding shape so that the brake and brake housing fit snuggly together, enabling friction between the brake and brake housing to stop rotation.

The resting or unarticulated state of the rotation control device is in a stop position with the cone being pushed into the brake housing. This is accomplished by a spring. The spring is placed between the outer housing and the cone and pushes on the cone. The spring is kept in place by a spring perch. Between the perch and the cone is a bushing, hereinafter referred to as a spring bushing. This bushing reduces the friction between the separate parts.

Within the cone is a recess, and within the recess is a rotation governor, in some embodiments the rotation governor is a sprag clutch. The sprag clutch enables rotation in one direction but not in the other. A sprag clutch is a one-way freewheel clutch. The sprag clutch is similar to a roller bearing, however, where a roller bearing includes rollers to decrease friction and enable smoother rolling, a sprag clutch has sprags, which are typically asymmetrical and figure eight shaped. When the sprag clutch is rotated in one direction, the sprags slip, or freewheel enabling movement. When the sprag clutch is rotated in the other direction, the sprags catch, causing a wedging action and preventing rotation. In some embodiments, the rotation governor is a ratchet. The rotation governor may be any device that allows rotation in a first direction and restricts or stops rotation in a second direction.

A shaft transmits the rotation from the input to a drum. The shaft connects to the sprag clutch and to the drum. The shaft also connects to the input. The input is where the rotational force comes from. In some embodiments, the input is a sleeve with an input interface. The input interface enables a tool to be used to generate rotational force. In some embodiments, the rotational force is applied by a handle. In some embodiments, the rotational force is applied by a tool such as a cordless drill. The input interface may be any of a variety of tool interfaces, such as in one embodiment a hex head, as would fit within a hex wrench or ratchet tool. In another embodiment, the interface may be a recessed square or cube, such as is used to connect a ratchet with its bits.

The input sleeve also includes a cam slot. The shaft includes a cam pin. The input sleeve fits over the shaft. The cam pin is located near the end of the shaft nearest the input. The cam pin of the shaft fits within the cam slot of the input sleeve. As the input sleeve is rotated, the cam pin slides in the cam slot. The cam pin sliding in the cam slot serves three purposes. First, the cam pin in the cam slot keeps the input sleeve attached to the shaft. Second, the input sleeve rotates around the shaft until the cam pin encounters the end of the cam slot, once the cam pin contacts the end of the cam slot, the shaft is rotated in the same direction as the input sleeve. Third, the cam slot is angled to push the input sleeve toward the cone.

When the input is rotated in one direction the input sleeve is pushed toward the cone. The sleeve pushes a sliding collar. The sliding collar pushes against the cone. The cone and rotation governor are pushed against the spring. As the collar pushes against the cone and the cone pushes against the spring, the cone is removed from contact with the brake housing. When the cone is removed from contact with the brake housing, the shaft is free to rotate in either direction.

The rotation control device may be used with any device that rotates some examples include winches, capstan winches, and scissors jacks.

In one embodiment, the rotation control device is used with a capstan winch. A capstan winch does not wind the line onto a drum, instead it wraps at least a portion of the line around a drum. As the drum is rotated the one end of the line is drawn closer to the drum and the other end of the line is fed off the drum. To initiate use of the capstan winch to pull something the other end of the line is fed through the capstan winch and the drum is rotated. To feed the line onto the drum it is desirable to be able to pull the line. As the line is pulled the drum rotates.

Figure 9:
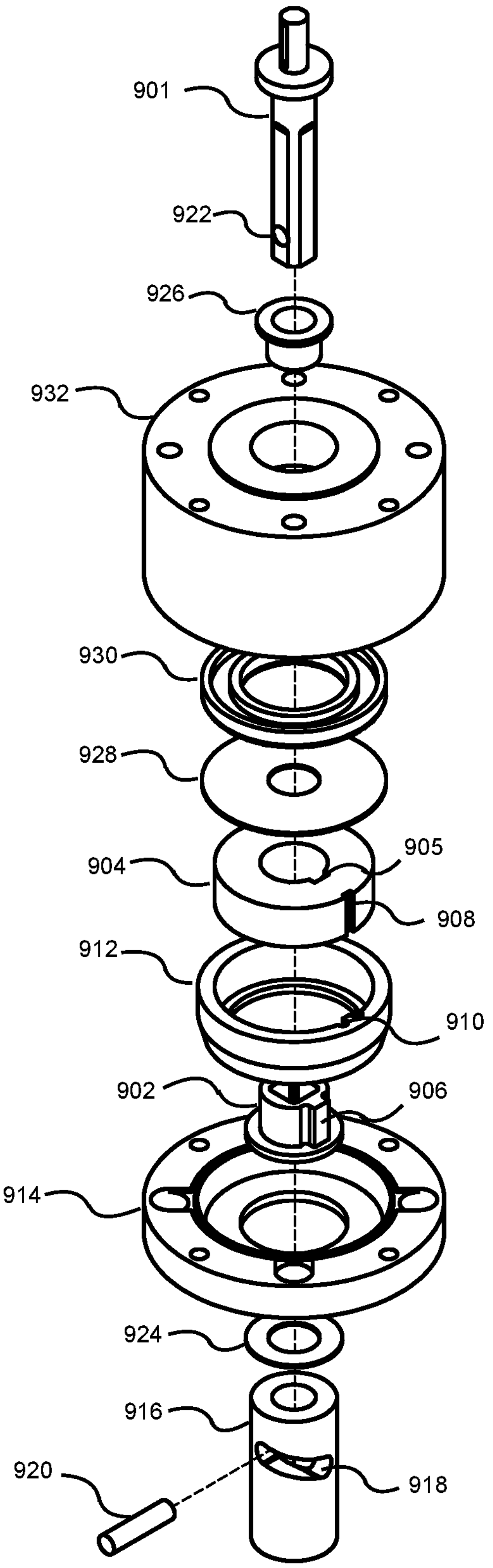
FIG. 9 is an exploded view of a rotation control device of the winch.

The rotation control device includes a brake housing, a brake, a sprag clutch, an input sleeve, an input bushing, a sliding collar, a shaft, a flange bearing, a spring bushing, and a spring perch. FIG. 9 is an exploded view of the device with the components individually visible. An input shaft 901 transfers the rotation to the rotating device which attaches at the top of the input shaft. The input shaft 901 passes through the other components of the device. In some embodiments, the input shaft has a square shape, that is the shaft is not a cylinder, instead it has four faces where each face is parallel to the axis of rotation. In alternative embodiments, the shaft has another number of faces. In some embodiments, the shaft has three faces. In another embodiment, the shaft has five faces, in another embodiment, the shaft has six faces. In other embodiments, the shaft has another number of faces. The shape of the shaft enables the shaft to interact with the other components of the rotation control device. The shaft fits into a sliding collar 902, where the sliding collar is shaped to accept the shaft.

The sliding collar 902 is shaped to fit into the sprag clutch 904. The shape of the sliding collar 902 is substantially cylindrical with a protrusion 906, the rotation governor, which in some embodiments is a sprag clutch 904, fits around the sliding collar 902 and has a divot 908 in the inner circumference, where the protrusion 906 of the sliding collar fits 902. The design of the sliding collar 902 fitting into and affixing the sliding collar 902 to the sprag clutch 904 is often referred to as being keyed together. The protrusion of the sliding collar 902 fits into the divot 905 of the sprag clutch 904 and turns the sprag clutch 904, in a way similar to a key turning a lock.

The sprag clutch 904 includes a divot 908 in the outer circumference into which is fit a protrusion 910 in the cone 912 of the cone brake. The sprag clutch 904 is keyed to fit into the cone 912. The divot 908 in the outer circumference of the sprag clutch 904 being keyed to fit into the protrusion of the cone 912 is one method of affixing the cone to the sprag clutch. The design of the key could be reversed where the divot is in the cone and the protrusion is on the sprag clutch. Additional divot and protrusion pairs can be used to affix the cone to the sprag clutch. Other methods of affixing the sprag clutch to the cone include welding, sintering, and bonding with adhesives.

These shapes are designed to enable the components to move together in specific ways. The square shape of the input shaft 901 fits into the square shaped sliding collar 902, which enables the input shaft 901 to turn the sliding collar 902. The sliding collar 902 is keyed to fit into the sprag clutch 904, which turns the sprag clutch 904. The sprag clutch 904 is keyed to fit within the cone brake 912, so when the sprag clutch 904 is turned, the cone brake 912 is turned.

The cone of the cone brake 912 interacts with a brake housing 914. The brake housing 914 is made of a durable hard material. In some embodiments, this is steel, in some other embodiments it is stainless steel. The cone 912, which can be thought of as the brake pad is also made of a durable material. However, it is advantageous for the cone 912 to be made from a different material. This is in part due to the process of galling, whereby when two surfaces move against each other they seize up. In most instances, this seizing is the result of cold welding, and is most common when the surfaces are constructed of the same material. By constructing the cone 912 from a material different than that of the brake housing 14, the possibility of galling is reduced. In some embodiments, the material of the cone 912 is softer than the material of the brake housing 914. In addition to lessening the possibility of galling, constructing the cone 912 of a softer material increases the friction between the cone 912 and the brake housing 914, which in turn increases the braking power of the rotation control device. In some embodiments, the cone 912 is made of brass. In some other embodiments, the cone brake 912 is make of another metal or metallic alloy.

An input sleeve 916 is rotated to rotate the input shaft 901. The input sleeve includes a rotation initiation interface. The rotation initiation interface accepts a rotation initiation tool.

In some embodiments, the rotation initiation interface is a square shaped recess, such as that used with a standard rachet wrench. In some embodiments, the rotation initiation interface is a hexagonal shaped recess, such that could be used with a hex or Allen wrench. In yet other embodiments, the rotation initiation interface is a hexagonal protrusion, such that a socket wrench could fit over. In some embodiments, the rotation initiation tool is a handle. In some embodiments, the rotation initiation tool is a drill. In some embodiments, the drill is a battery powered drill.

The input sleeve 916 fits around the input shaft 901. The input sleeve 916 includes a cam slot 918. A cam pin 920 is attached to the input shaft 901. The cam pin 920 is oriented perpendicular to the axis of rotation of the input shaft, in a pin aperture 922. The cam pin 920 rides in the cam slot 918. Rotating the input sleeve 916 will rotated the input shaft 901 when a side of the cam slot 918 comes into contact with the cam pin 920.

A spring (not shown) pushes the cone 912 into contact with the brake housing 914. The spring fits within a spring perch 930. The spring pushing the cone 912 into contact with the brake housing 914 applies the force to provide friction to keep the cone from rotating withing the brake housing.

A gearbox housing 932 fits around and protects the components.

There are several bearings in the rotation control device, these bearing help reduce friction between working components. Between the input sleeve 916 and the sliding collar 902 is an input bushing 924. The input bushing 924 helps reduce friction between the input sleeve 916 and sliding collar 902. A flange bearing 926 helps reduce friction around the top of the input shaft 901. A spring bushing 928 is between the sprag clutch 904 and the spring perch 930.

The device is rotatable to cause rotation of a winch or other rotational device. The device transmits rotation from an input, the direction of rotation from the input may be in either direction. The device is further designed to allow rotation from a drum, and the rotation from the drum side is allowed in one direction and not in the other direction.

Figure 10:
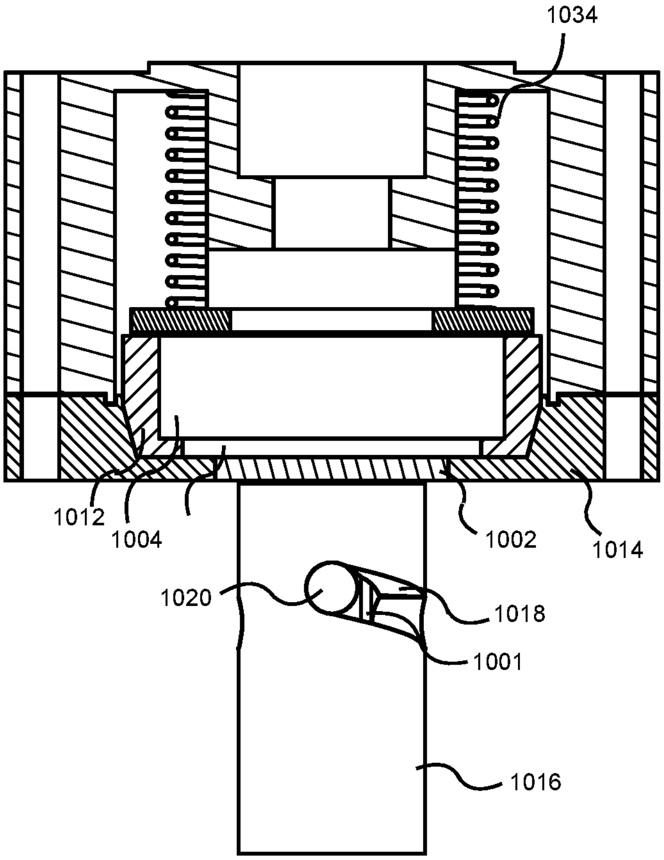
FIG. 10 is a cross section of a rotation control device of the winch.

FIG. 10 is a cut-away view of the rotation control device. The rotation control device inhibits motion through friction between the cone 1012 and the brake housing 1014. A spring 1032 is extended and pushes the cone 1012 into the brake housing 1014. The cone 1012 can be thought of as a brake pad, and the brake housing 1014 can be thought of as the brake rotor. The cone 1012 is cone shaped, or more accurately the cone brake is frustoconical in shape. The brake housing 1014 has a corresponding shape, so that the cone 1012 fits snuggly within the brake housing 1014. Ideally, the cone 1012 and the brake housing 1014 fit so well together that there is no space between them. With the cone 1012 being constructed of a material that is softer than the brake housing 1014, the cone 1012 will eventually wear away until the cone 1012 and the brake housing 1014 fit together with no gaps. The tighter the fit, the more friction is produced between the cone 1012 and the brake housing 1014.

In FIG. 10, the input sleeve 1016 is not cut away. As the input sleeve is rotated, the cam pin 1020 follows the path of the cam slot 1018. The cam pin 1020 is attached to the input shaft 1001. When the input sleeve 1016 is rotated in the clockwise direction (in FIG. 10 this is to the right), the cam pin 1020 follows the cam slot 1018 until the cam pin 1020 impacts the side, or the first end, of the cam slot 1018. Once the cam pin 1020 impacts the side, or the first end, of the cam slot 1018, rotation of the input sleeve 1016 causes rotation of the input shaft 1001. As can be seen in FIG. 10 when the input sleeve 1016 is rotated clockwise, the side or the first end of the cam slot 1018 is positioned so as to keep the cone 1012 in contact with the brake housing 1018. When the input sleeve 1016 is rotated clockwise and the input sleeve 1016 comes into contact with the cam pin 1020, the input shaft 1001 is rotated in the clockwise direction. When the input shaft 1001 is rotated in the clockwise direction, the cone 1012, remains in contact with the brake housing 1014, and does not rotate. When the cone 1012 does not rotate when the input shaft 1001 is rotated in the clockwise direction, the input shaft 1001 causes the sprag clutch to rotate. The sprag clutch rotates in a single direction. In the embodiment currently described, the sprags of the sprag clutch allow rotation in the clockwise direction. The input shaft will not rotate the sprag clutch in the counterclockwise direction, this is because of the design of the sprag clutch, which locks up when attempted to rotate in the counterclockwise direction.

This unidirectional movement is beneficial in pulling the end of a line toward a drum. In a winch a line is wound onto a drum and if the rotation control device mechanism is used with a winch the sprag clutch would allow the line to be wound onto the winch drum but would prevent the line from being pulled of the drum when the line is pulled. Another type of pulling device, a capstan winch, does not wind a line onto a drum, but pulls the line toward a drum and feeds the line off the drum. In capstan winch embodiments, the sprag clutch will rotate and pull one end of the line toward the drum but will not allow rotation if that end of the line is pulled.

Figure 11:
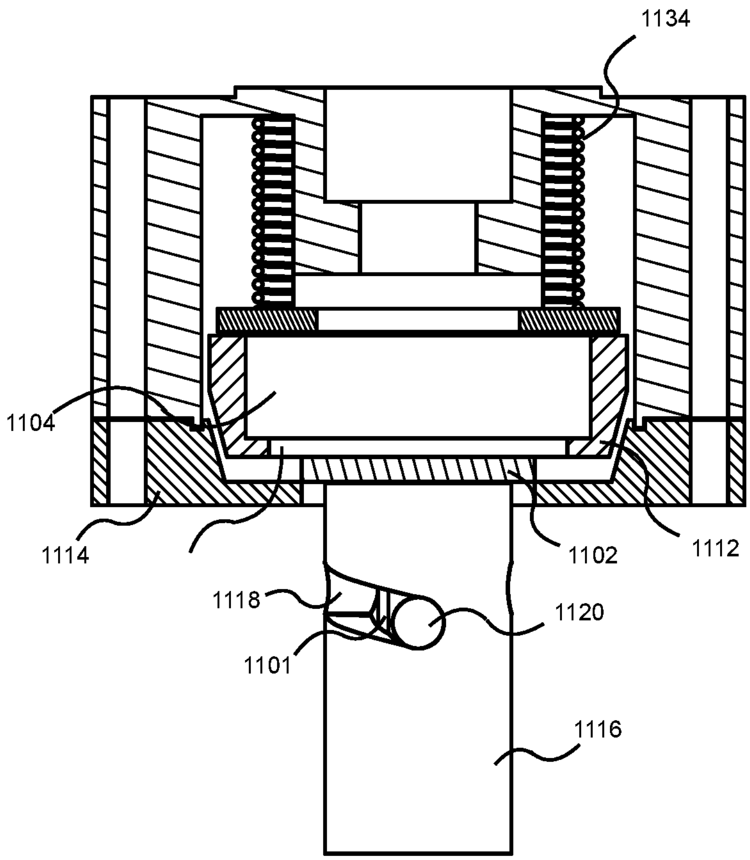
FIG. 11 is a cross section of a rotation control device of the winch.

FIG. 11 is a cut away view of the rotation control device. The rotation control device is designed to inhibit motion through friction between the cone 1112 and the brake housing 1114, when the cone 1112 is in contact with the brake housing 1114. The rotation control device is designed to enable motion when the cone 1112 is not in contact with the rotation control device 1114. When the spring 1134 is compressed the cone 1112 is taken out of contact with the brake housing 1114 the friction between the cone brake 1112 and the brake housing 1114 is eliminated.

In FIG. 11, the input sleeve 1116 is not cut away. As the input sleeve is rotated, the cam pin 1120 follows the path of the cam slot 1118. The cam pin 1120 is attached to the input shaft 1101. When the input sleeve 1116 is rotated in the counterclockwise direction (in FIG. 11 this is to the left), the cam pin 1120 follows the cam slot 1118 until the cam pin 1120 impacts the side, or the second end, of the cam slot 1118. Once the cam pin 1120 impacts the side, or the second end, of the cam slot 1118, rotation of the input sleeve 1116 causes rotation of the input shaft 1101. As can be seen in FIG. 11 when the input sleeve 1116 is rotated counterclockwise, the side, or the second end, of the cam slot 1118 is positioned so as to lift the cone 1112 out of contact with the brake housing 1118. When the input sleeve 1116 is rotated counterclockwise the input sleeve 1116 follows the path of the cam slot 1118. As the cam slot 1118 rides on the cam pin 1120, the input sleeve 1116 and the sliding collar 1102 are directed toward the cone 1112. The input bushing 1124 reduces friction between the cone and the sliding collar. Directing the input sleeve 1116 and the sliding collar 1102 toward the cone 1112 causes the cone 1112 to be lifted away from the brake housing 1114. In addition to lifting the cone 1112 away from the brake housing 1114 rotating the input sleeve 1116 in the counterclockwise direction causes the input shaft 1101 to be rotated in the counterclockwise direction. When rotated in the counterclockwise direction In the embodiment currently described, the sprags of the sprag clutch allow rotation in the clockwise direction. The input shaft will not rotate the sprag clutch in the counterclockwise direction, this is because of the design of the sprag clutch, which locks up when attempted to rotate in the counterclockwise direction.

Figure 12A:
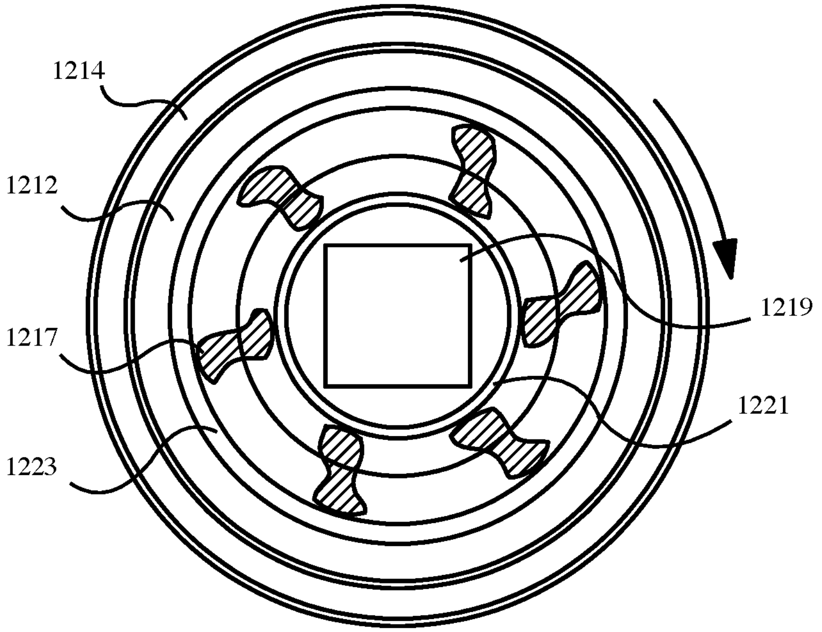
FIG. 12*a* is a view of a sprag clutch in the rotation control device.
Figure 12B:
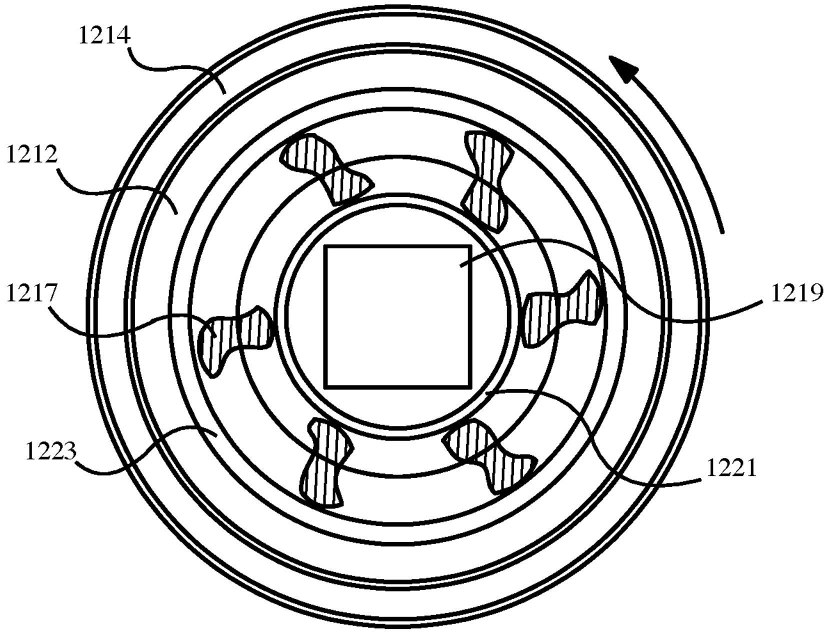
FIG. 12*b* is a view of a sprag clutch in the rotation control device.

A cut-away view of the in the sprag clutch in the rotation control device, as seen in FIGS. 12*a*-12*b* shows how the clutch enables rotation in one direction and inhibits rotation in another direction. Viewing a top-down cut-away view shows the brake housing 1214, the cone 1212, and the sprag clutch 1204. The bore 1219 of the sprag clutch is square so as to interact with the input shaft which has a square cross section. The square bore interacting with the input shaft enables the sprag clutch to be the determining component of the rotation control device. The rest of the components in the rotation control device have round bores. A round bore will not interact with the input shaft. The sprag clutch is keyed into the cone brake so the turning of the sprag clutch can turn the cone brake, such as when the sprag clutch is engaged and the cone brake is moved out of contact with the brake housing. The sprag clutch includes sprags such as sprag 1217. The sprag clutch functions similarly to a bearing with the sprags being located between an inner race 1221 and an outer race 1223. When the sprag clutch is rotated in the clockwise direction, as in FIG. 12, the sprags, such as sprag 1217, do not engage, enabling the clutch to rotate. When the sprag clutch is rotated in the counterclockwise direction, as in FIG. 13, the sprags, such as sprag 1217, engage, locking the inner race 1221 and outer race 1223 together, and preventing rotation of the sprag clutch.

The rotation control device with its combination of brake and sprag clutch enables control of the rotation of a shaft. The brake stops rotation in either direction of the cone, while the cone is in contact with the brake housing. Lifting the cone out of contact with the brake housing enables rotation. Affixing a rotation governor, such as a sprag clutch, within the cone, increases the control over the rotation of a shaft. The sprag clutch will allow rotation in a first direction and eliminate rotation in a second direction, this enables rotation in a first direction without the possibility of the shaft slipping in the second direction. This is particularly useful in situations where rotation of the shaft in one direction creates or increases a load on the shaft which would result in the shaft rotating the second direction if the force causing the rotation is released. In these situations, stopping rotation in the second direction is more efficient and safer than allowing rotation in the second direction.

The winch is operable by several methods. These methods include manual operation as well as motorized operation.

Figure 13A:
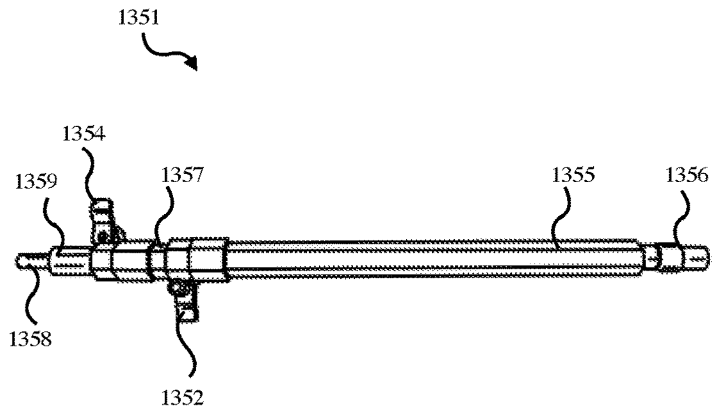
FIG. 13*a* is a view of an extendable handle in a collapsed position.
Figure 13B:
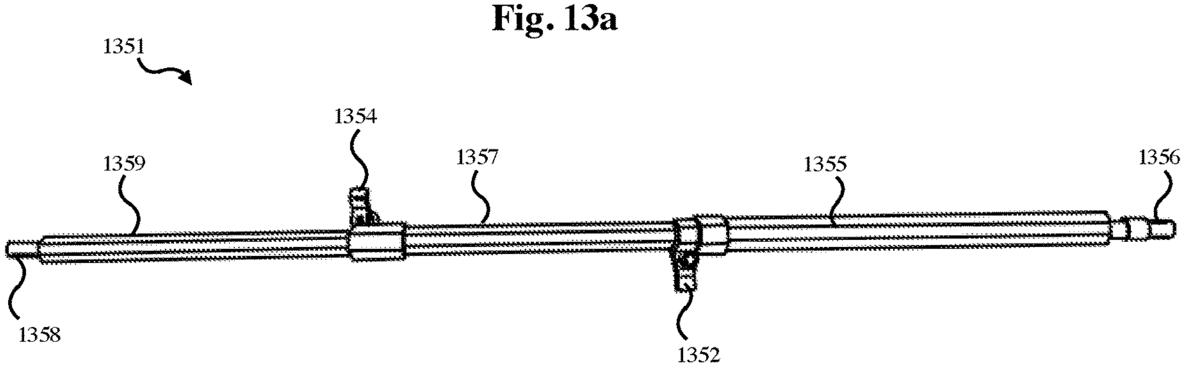
FIG. 13*b* is a view of an extendable handle in an extend position.
Figure 13C:
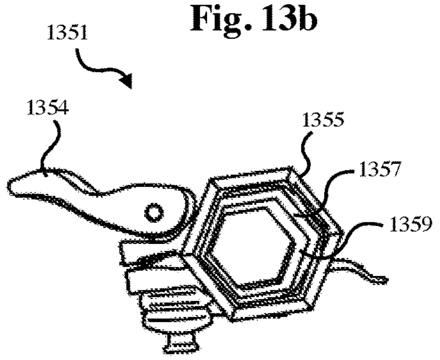
FIG. 13*c* is an end view of an extendable handle.

FIGS. 13*a*-13*c* depict an extendable, or telescoping handle for use with the winch. FIG. 13*a* shows the handle in a compressed position, FIG. 13*b* shows the handle in an extended position, and FIG. 13*c* shows an end view of the handle. The extendable handle 1351 is hexagonal in cross section. The shape of the handle is important so that it can accept and input torque to the input sleeve. There are many extendable devices such as ski poles, however none of these extendable devices can accept and impart torque. The hexagonal shape enables the handle to be used to impart rotational force or torque.

In the depicted embodiment, the handle has three sections. Each of these sections are of differing sizes. The base section 1355 is the largest, and the middle section 1357 fits within the base section. The end section 1359 fits within the middle section 1357. Compression locks 1352 and 1354 are used to lock the sections in position. The sections can be fully or partially extended, and the compression locks will keep each section in place. Attached to the base section is the input sleeve insert 1356, which fits within the input sleeve of the rotation control device. Attached to the end section is the turning insert 1358 which fits within a portion that is attached perpendicular to the extendable handle to impart rotational motion.

In one embodiment, the gear is turned by a motor. In some of these embodiments, the motor is a drill. Such as that depicted in FIG. 14. The drill 1461 could attach in similar fashion to the wrench or socket wrench. Using a drill is advantageous because the drill requires less effort by the individual using the winch. There are many options of cordless drills, and many individuals carry a drill in their vehicle, either for work or being prepared for work.

Figure 15:
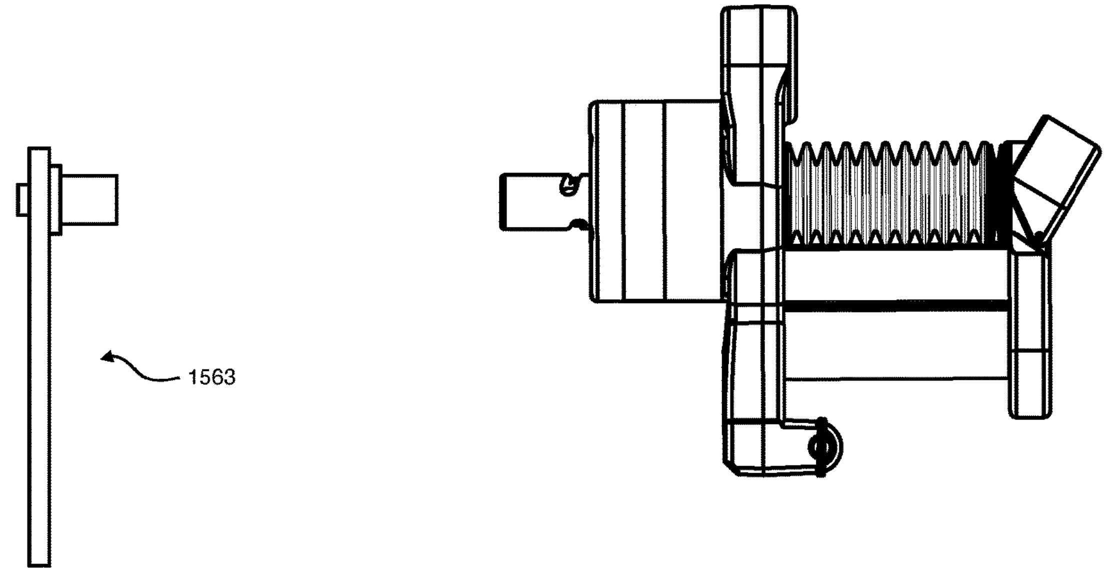
FIG. 15 is a view of a wrench for rotating the rescue winch.

In another embodiment, the gear is turned manually, such as with a specific use handle, designed to be used with the winch. In other embodiments, a wrench 1563 is used as the handle, as depicted in FIG. 15. In some embodiments, another lever is used. In some embodiments, the wrench is a ratcheting wrench or ratcheting socket wrench. The wrench is attached to the gear and turned, as the gear is turned it turns the drive cylinder, as previously explained. This embodiment is advantageous because it enables the winch to be operated without electrical power. Operating the winch pulling device without power makes it especially transportable. A manual winch could therefore be used to pull a vehicle from a stuck situation. For example, if a vehicle goes off an embankment in a remote location where contacting others for help or rescue is not an option, the winch could be used to return the vehicle to the road. Additionally, overlanding is a popular activity where vehicles are driven over long distances and often rough terrain where rescue would be impractical if not impossible, having the winch available in these situations would enable self-rescue.

Figure 16:
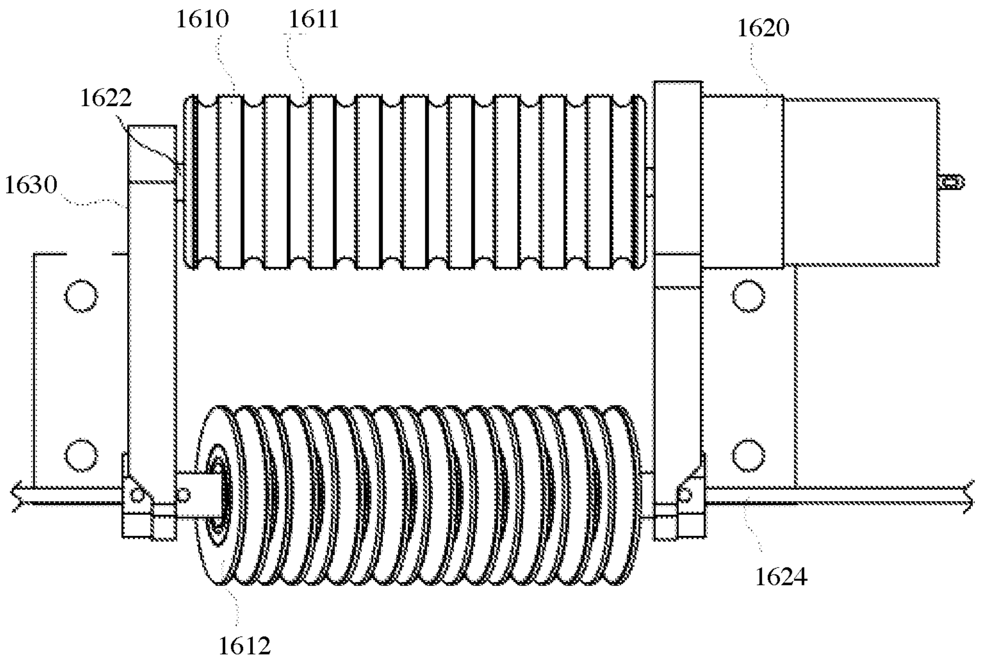
FIG. 16 is an elevation view of the capstan winch without a line attached.
Figure 17:
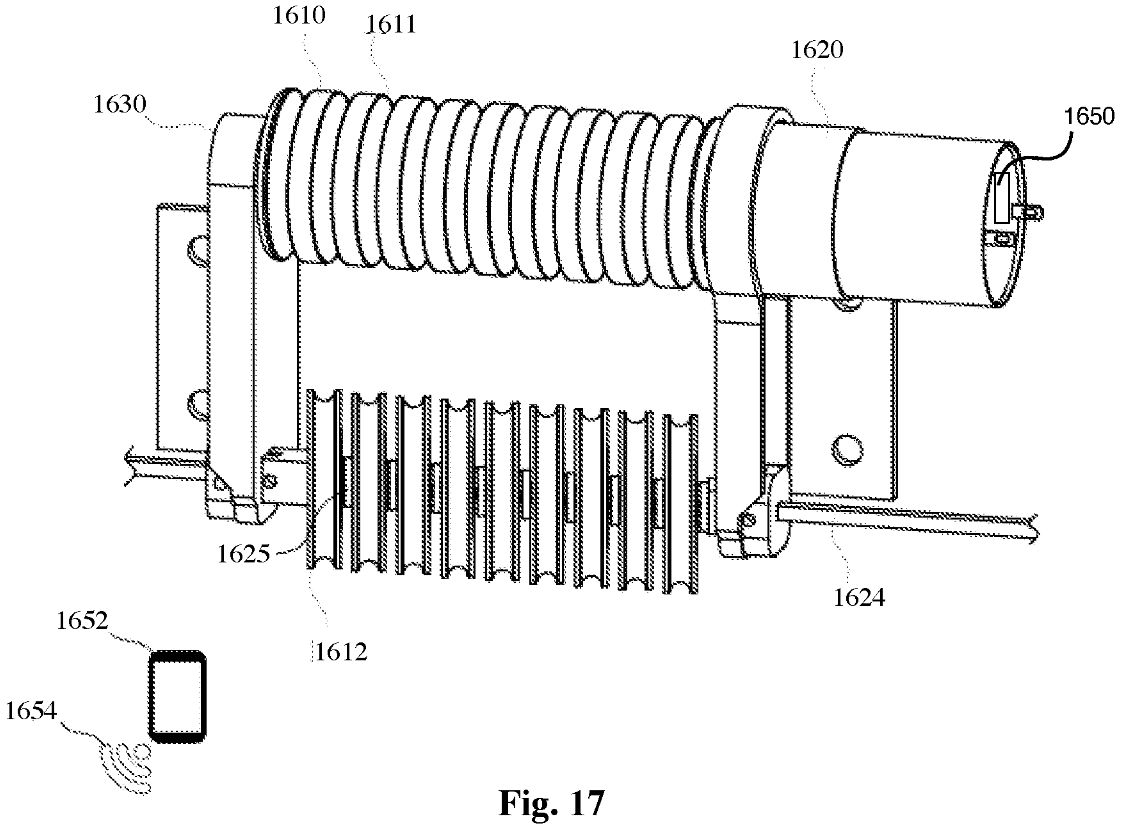
FIG. 17 is an isometric view of the capstan winch without a line attached.

Now referring to FIG. 16, which is an elevation view of one embodiment of the device 1630 with the line removed. A drive cylinder 1610 rotates, about its longitudinal axis, on a drive shaft 1622 driven by a motor 1620. The drive cylinder 1610 has drive grooves 1611 that are parallel to one another and perpendicular to the long axis of the drive cylinder 1610. Parallel to the longitudinal axis of drive shaft 1622 is an idler shaft 1624 with angled idler bearings 1625 on which idler pulleys 1612 rotate parallel to one another and at an angle to the drive grooves 1611. The angle is such that as the line passes around a first of the drive grooves 1611 and onto a first of the idler pulleys 1612, the line, as it comes off the first of the idler pulleys 1612, is aligned with a second of the drive grooves 1611. This continues across the device 1630, with each drive groove 1611 being fed line 1614 from one of the idler pulleys 1612 and then feeding that line to a next of the idler pulleys 1612. In other words, the angle is sufficient that the line coming off each side of a drive groove 1611 aligns with neighboring idler pulleys 1612. This angle eliminates side loading of the idler pulleys 1612. The wrapping and tension produce a capstan effect on the line 1614 such that turning the drive cylinder 10 clockwise (from the end of the motor 1620) causes the line to be drawn in, pulling the object. Turning the drive cylinder 1610 counterclockwise causes the line to be drawn out.

In some embodiments, the number of drive grooves is one greater than the number of idler pulleys.

The surface of the grooves is preferably designed so as to provide the right balance between friction and wear on the line. In other words, the total surface of the grooves that engages the line need to have enough friction, i.e., grip, with the line so that the line can be pulled by rotation of the drive cylinder. Likewise, the surface of the grooves should not have so much friction, e.g., roughness, so that the line wears unnecessarily as it is passed over the grooves repeatedly.

The more grooves and the bigger the area of contact between the grooves and the line means that each groove needs less friction. In some embodiments, there are only three drive grooves and only two idler pulleys. In other embodiments, there are only two drive grooves and one idler pulley. In a preferred embodiment, there are at least five grooves and four pulleys. In a more preferred embodiment, as in FIGS. 16-19, there are at least ten grooves and at least nine pulleys. The fewer the grooves, the greater the friction required on the surface or force supplied by another tensioning device. The surface of the grooves can be tailored with special coatings, such as a soft polymeric coating, e.g., urethane or rubber, that would provide a better grip on the line. Alternatively, the surface of the grooves can be roughened, for example by etching, abrading or the like. Also, the outer surface of the line itself may be tailored with polymers coatings and the like, so as to provide more grip on the rollers.

A drive cylinder 1610 has drive grooves 1611 that are parallel to one another and perpendicular to the long axis of the drive cylinder 1610. In some embodiments, the drive cylinder 1610 is driven by a motor 1620 powered by a battery. Parallel to the drive cylinder 1610 is an idler shaft 1624 with angled idler bearings 1625 on which idler pulleys 1612 rotate parallel to one another and at an angle to the drive grooves 1611. The angle is such that as the line passes around a first of the drive grooves 1611 and onto a first of the idler pulleys 1612, the line, as it comes off the first of the idler pulleys 1612, is aligned with a second of the drive grooves 1611. This continues across the device 1630, with each drive groove 1611 being fed line from one of the idler pulleys 1612 and then feeding that line to a next of the idler pulleys 1612. In other words, the pulleys are angled so that the front and back of the grooves of each idler pulley 1612 aligns with adjacent drive grooves 1611. This angle eliminates side loading of the idler pulleys 1612. One end of the line extends to the object being moved. The other end of the line enters the line tensioner and is pulled on by rollers, driven by motor. When the object is being pulled towards the device 1630, the rollers pull the line through the line tensioner and into a space, such as a bag or some other cavity, where the line is collected. When the line is pulled back out, the rollers reverse and move such that the line is still under tension, but only enough to maintain tension, not enough to prevent the line end from being returned to a distance away from the device 1630.

In this embodiment, a controller 1550 controls the motor 1620 and the roller motor and receives information from the motor, the roller motor, the battery, and a line counter. A smart device 1652 can transmit 1654 instructions to the controller 1650, allowing for the user to control operations. The smart device 1652 also receives the information from the controller, allowing the user to see information from sensors such as battery levels, current draw by the motors, how much line is extended, how much force is exerted on the line, and other typical information desired by users. In some embodiments, sensors are provided that transmit information to the smart device, the sensors transmitting information selected from the group consisting of a force on the line, a position of the line in the device, power remaining in a battery that drives the motor, current draw by the motor, and combinations thereof.

Figure 18:
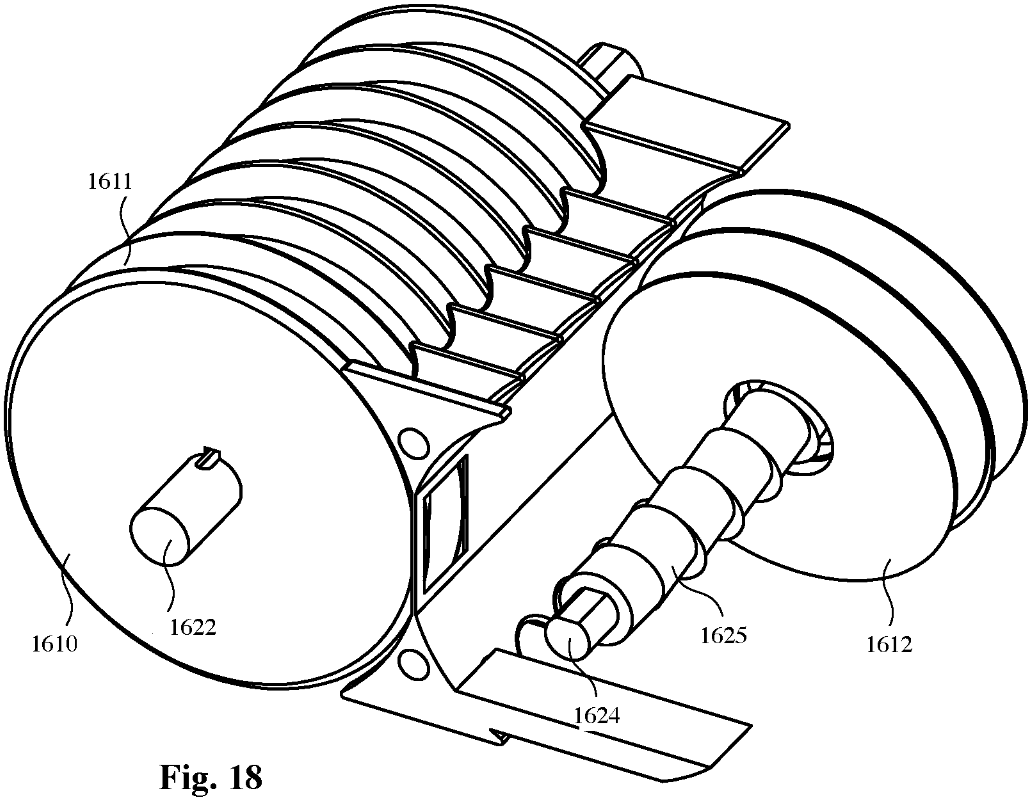
FIG. 18 is a partially exploded isometric view of the capstan winch.
Figure 19:
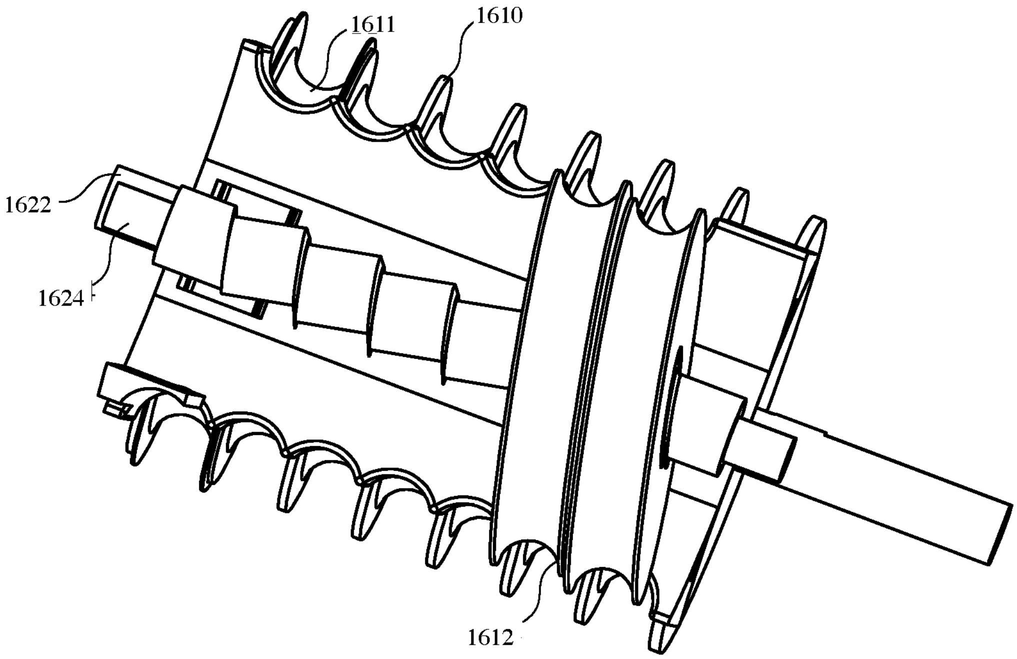
FIG. 19 is a partially exploded and cross-sectional view of the capstan winch.

FIGS. 18-19 show the internal workings of the idler pulleys. Parallel to the drive cylinder 1610 is an idler shaft 1624 with angled idler bearings 1625 on which idler pulleys 1612 rotate parallel to one another and at an angle to the drive grooves 1611. The angle is such that as the line passes around a first of the drive grooves 1611 and onto a first of the idler pulleys 1612, the line, as it comes off the first of the idler pulleys 1612, is aligned with a second of the drive grooves 1611.

In one embodiment, the device 1630 is mounted directly to a car and acts as a winch. The line is drawn out by hand. In another embodiment, the line is drawn out by mechanical means. In a preferred embodiment, the line is drawn out past the amount needed and then it is drawn back in by the controller until it reaches tension. At that point, the device acts as a winch.

Figure 20:
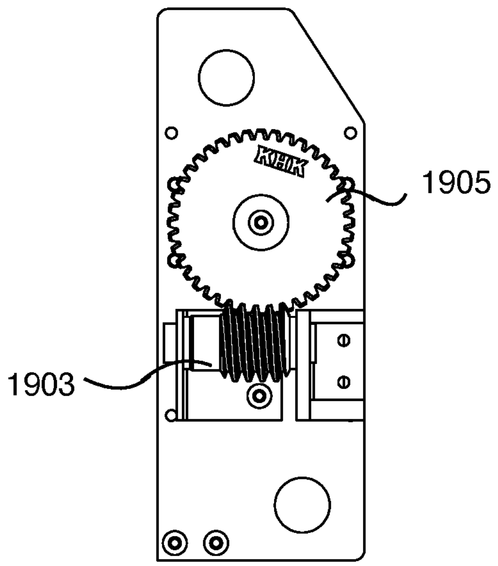
FIG. 20 is a bottom view of a capstan winch utilizing a worm gear
Figure 21:
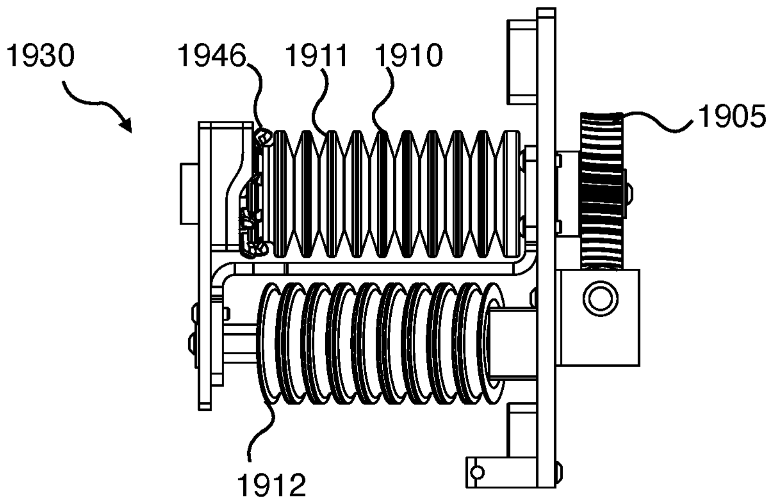
FIG. 21 is a front view of a capstan winch utilizing a worm gear.

FIGS. 20 and 21 depict the capstan winch with a worm gear as the driving gear. A worm gear has several advantages in use. One such advantage, is that in many worm drive configurations in the worm wheel cannot drive the worm. For a worm drive to be self-locking depends on the lead angle, the pressure angle, and the coefficient of friction. Larger reduction ratios involve greater friction between the worm and the worm wheel. Self-locking drives also do not allow reversing the direction of transmission. Single-start, or one spiral worms are especially proficient at not permitting the transmission to reverse direction. This also prevents the output from driving the input. A multi-start worm or a worm that has multiple spirals, reduces the ratio, the braking effect of the worm and worm wheel will need to be discounted, and the wheel may be able to drive the worm. As worm gear 1903 is rotated it rotates the worm wheel 1905. The worm wheel is then attached to the drive cylinder.

The worm gear has a helical groove around the outer circumference of the gear. As this gear is rotated around its longitudinal axis the helical groove engages the teeth around the circumference of the worm wheel. The worm wheel is attached to a drive cylinder, similar to that described above. Worm gears are configured such that the number of rotations determines the number of tooth spaces the worm wheel turns depend on the rotations around the worm gear. For example, a single start gear would take one rotation to move one-wheel tooth space. This also relates to the gear reductions; the more rotations are requiring moving wheel gear spaces relates to reduction in gears. A 10 to one reduction would require 10 rotations to move one-wheel tooth space.

A drive cylinder 1910 has drive grooves 1911 that are parallel to one another and perpendicular to the long axis of the drive cylinder 1910. The drive cylinder 1910 is driven by the worm wheel 1905. Parallel to the drive cylinder 1910 is an idler shaft 1924 with angled idler bearings 1925 on which idler pulleys 1912 rotate parallel to one another and at an angle to the drive grooves 1911. The angle is such that as a line passes around a first of the drive grooves 1911 and onto a first of the idler pulleys 1012, the line 1914, as it comes off the first of the idler pulleys 1912, is aligned with a second of the drive grooves 1911. This continues across the device 30, with each drive groove 1911 being fed line from one of the idler pulleys 1912 and then feeding that line to a next of the idler pulleys 1912. In other words, the pulleys are angled so that the front and back of the grooves of each idler pulley 1912 aligns with adjacent drive grooves 1911. This angle eliminates side loading of the idler pulleys 1912. One end of the line extends to the object being moved. The other end of the line enters the line tensioner 1946 and is pulled on by rollers, driven by worm wheel 1905. When the object is being pulled towards the device 1930, the rollers pull the line through the line tensioner 1946 and into a space, such as a bag or some other cavity, where the line is collected. When the line is pulled back out, the rollers reverse and move such that the line is still under tension, but only enough to maintain tension, not enough to prevent the line end from being returned to a distance away from the device 1930.

The attachment of the wrench or drill to the drive gear can be accomplished in multiple ways. In one embodiment, the attachment is a recessed square, similar to the attachment of a socket wrench. The socket portion of the socket wrench includes a recessed square where the square insert on the handle of the socket wrench fits. In this way a standard socket wrench handle can be used to drive the capstan winch. In another embodiment, a special made handle with a protruding square is used to drive the capstan winch. The special made handle is produced in various lengths. A longer handle gives more leverage. In another embodiment, the attachment is a hex nut. A hex nut style attachment is advantageous because hex nuts are a common attachment mechanism. Various tools are compatible with hex nuts including tire irons, wrenches, socket wrenches, and drill attachments. For example, in the overlanding example previously described, anyone participating in overlanding would have a way to remove the lug nuts attaching the tires, this will typically be a tire iron.

Figure 22:
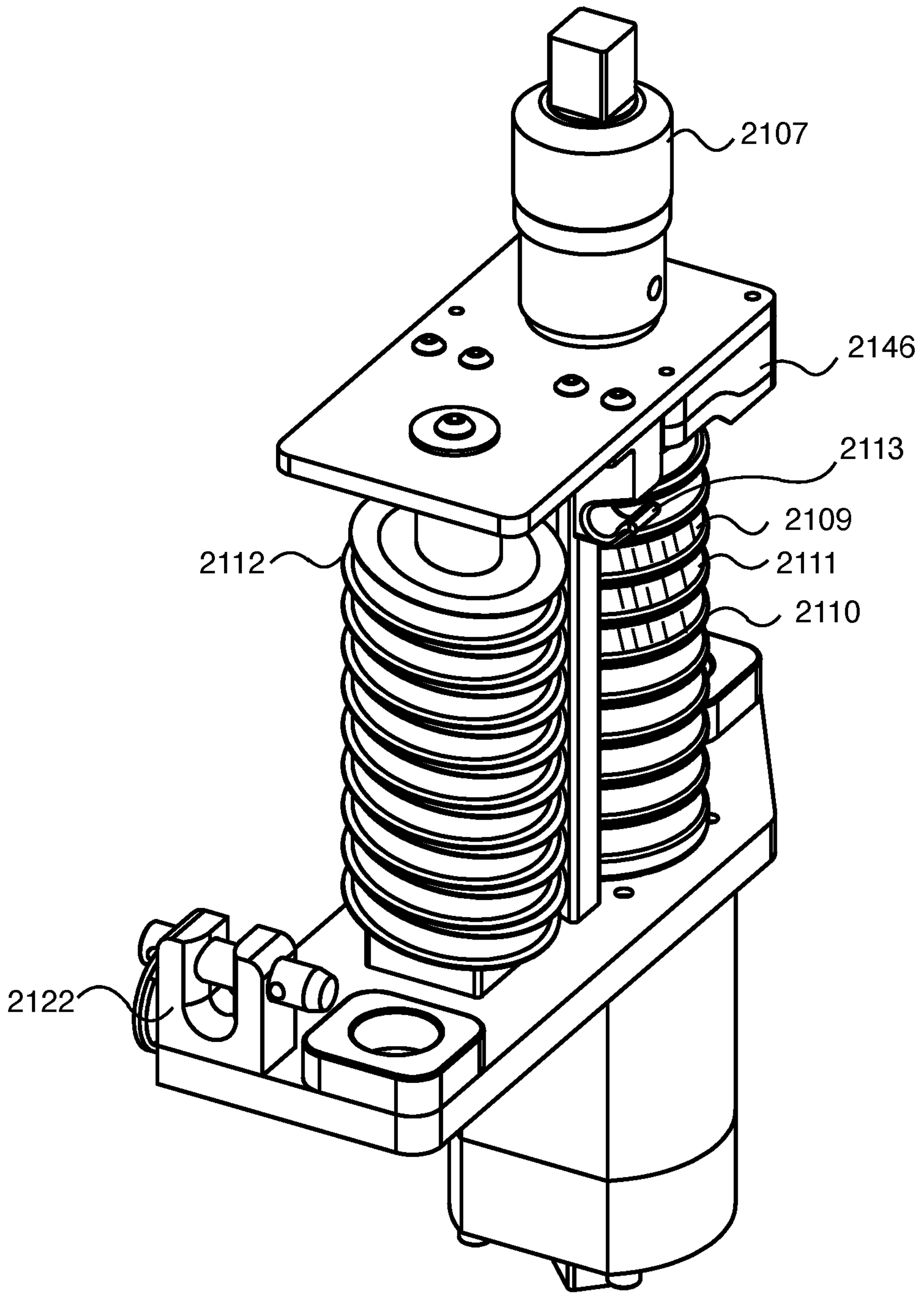
FIG. 22 is a front view of a capstan winch utilizing a ratchet.
Figure 23:
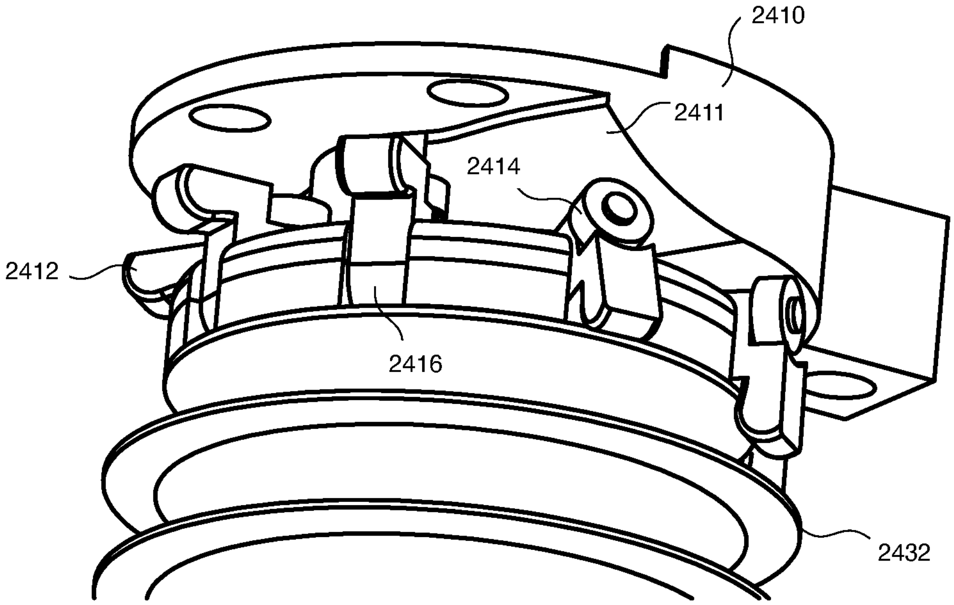
FIG. 23 is a side view of a line tensioner system for a capstan winch.
Figure 24:
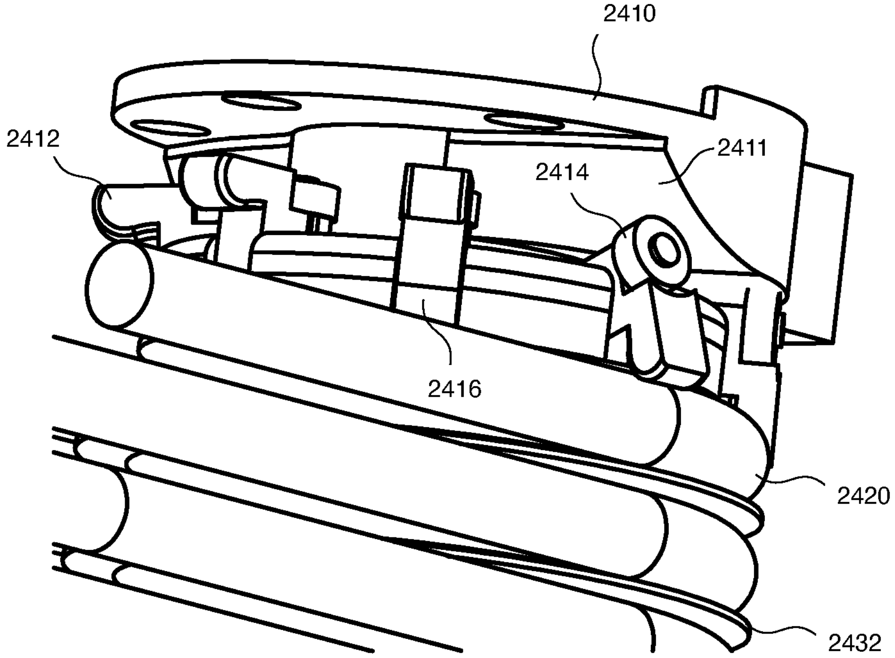
FIG. 24 is a side view of a line tensioner system with a line being tensioned for a capstan winch.
Figure 25:
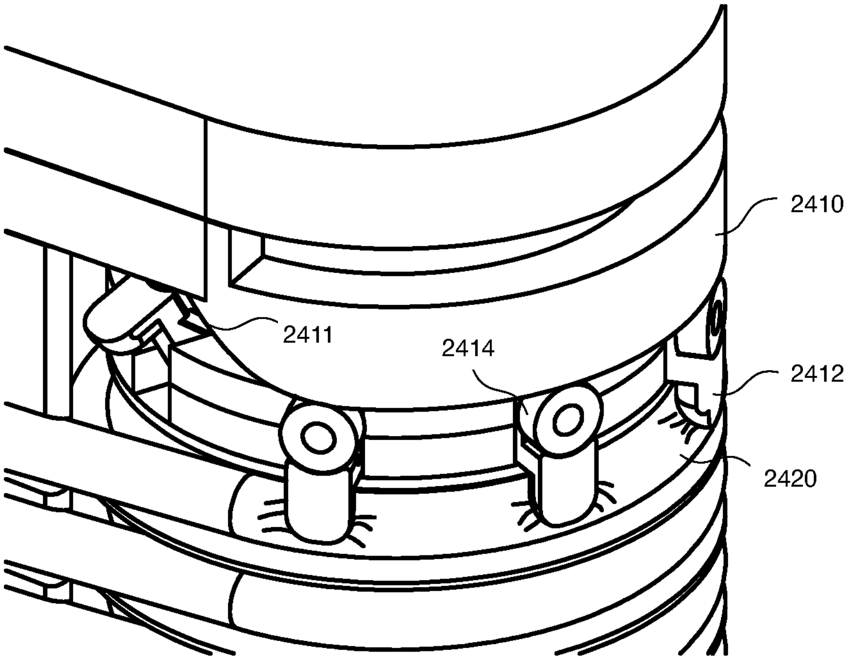
FIG. 25 is a rear view of a line tensioner system for a capstan winch.
Figure 26:
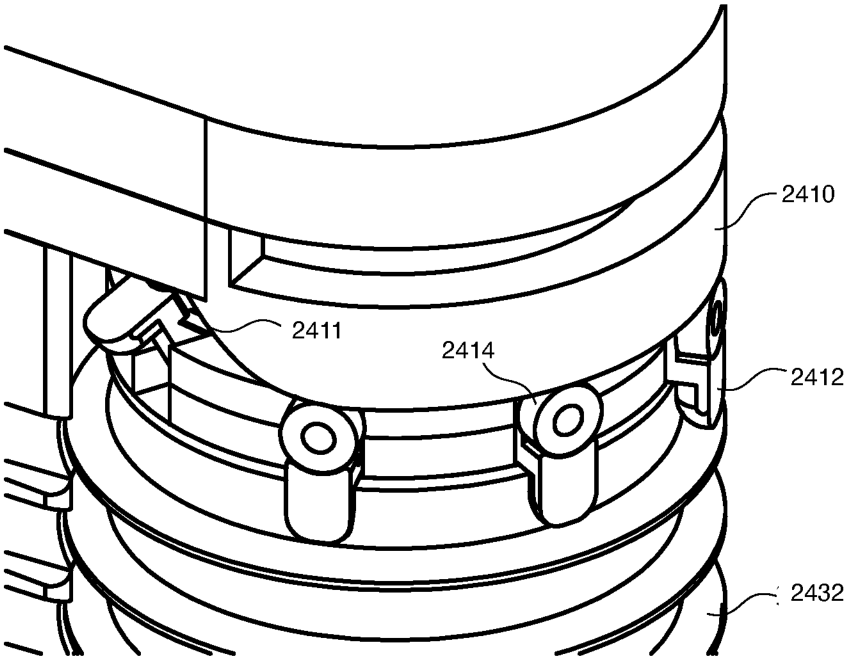
FIG. 26 is a rear view of a line tensioner system for a capstan winch.

FIG. 22 shows the capstan winch configured with an engageable one-way brake 2107. The one-way brake performs a similar function to the worm gear described above, in that it when engaged, the one-way brake works to permit the drive cylinder to be rotated in the direction to wind the line but does not permit rotation in the direction to unwind the line. In other words, the line can be wound around the grooves and pulleys to thereby pull the object toward the winch but does not allow the object to move away from the winch, e.g., slide back down a hill. If desired to allow the object to move away from the winch or if needed to loosen the line for disengagement of the line from the object, the brake can be disengaged so that the winch can be operated to let the line out.

One advantage of the depicted capstan design is that, when the brake is engaged and there is tension on the line, the line is held tightly by the winch and does not slip out. In other words, the line is securely held by the drive grooves 2111 and idler pulleys 2112 so that the object is not allowed to move away from the winch, e.g., slide back down a hill.

Another advantage of the one-way brake is that it does not require power input to keep the movable object from sliding back. Thus, if the winch is operated by hand, user strength is required to turn the drive cylinder, but not required to keep the movable object from sliding backward, e.g., back down an incline.

Preferably, the brake 2107 is in the form of a releasable ratchet. Such ratchets are well known in the art. The requirement for this ratchet is that it can hold the weight of the object being winched, e.g., up to 10,000 pounds.

As in the other depicted embodiments, the winch of FIG. 22 includes a drive cylinder 2110 with drive grooves 2111 that are parallel to one another and perpendicular to the long axis of the drive cylinder 2110. The drive cylinder 2110 is driven by the rachet 2107. Parallel to the drive cylinder 2110 is an idler shaft 2124 with angled idler bearings 2125 on which idler pulleys 2112 rotate parallel to one another and at an angle to the drive grooves 2111.

In the depicted embodiment, the drive cylinder is operated through the shaft 2106, which includes a drive ratchet 2107. The drive ratchet 2107 is configured similar to the typical ratchet wrench, so that when the head 2104 is rotated in one direction, the shaft is rotated with it. When the head is rotated in the other direction, the shaft is not rotated. In this way, when a bar or wrench 2115 is used to rotate the head, it can be moved back and forth to turn the drive cylinder. The requirement for the drive ratchet 2107 is that it can withstand the torque needed to drive the drive wheel.

In the depicted embodiment, one turn of the drive shaft 2106 produces one turn of the drive cylinder. In alternative embodiment, gearing is provided to either increase or decrease the number of turns of the drive cylinder per turn of the drive shaft.

The embodiment depicted in FIG. 22 includes a line guide 2113, through which the line passes as it comes into the winch from the direction of the movable object. Preferable, the line guide is equipped with a quick release pin so that the line can be inserted into the line guide or removed from the line guide without requiring the end of the line to pass through it.

In some embodiments, the drive grooves include traction assists 2109. These traction assists provide added grip to the line to increase the tension such that the line is firmly held in place within the drive grooves. In some embodiments, these traction assists 2109 are raised ridges on in the drive grooves. In other embodiments, these traction assists are troughs in the drive grooves. These traction assists keep the line from slipping through the drive grooves. There is also a line guide 2113 which directs the line onto the correct drive groove. This keeps the line properly aligned and limits line entanglements. Line director 2122 further keeps the line in proper alignments so that the line smoothly flows through the capstan winch.

The angle of the idler pulleys 2112 is such that as a line passes around a first of the drive grooves 2111 and onto a first of the idler pulleys 2112, the line, as it comes off the first of the idler pulleys 2112, is aligned with a second of the drive grooves 2111. This continues across the device 2130, with each drive groove 2111 being fed line from one of the idler pulleys 2112 and then feeding that line to a next of the idler pulleys 2112. In other words, the pulleys are angled so that the front and back of the grooves of each idler pulley 2112 aligns with adjacent drive grooves 2111. This angle eliminates side loading of the idler pulleys 2112.

One end of the line extends to the object being moved. The other end of the line enters the line tensioner 2146 (see the discussion of FIGS. 23-26 below) and is pulled on by rollers, driven by worm wheel 2105. When the object is being pulled towards the device 2130, the rollers pull the line through the line tensioner and into a space, such as on the ground or in a bag or some other container, where the line is collected. When the line is pulled back out, the rollers 2147 reverse and move such that the line is still under tension, but only enough to maintain tension, not enough to prevent the line end from being returned to a distance away from the device 2130.

When configured with a drive ratchet, the capstan device is operable by several methods. For example, with a drill and with a wrench. In one embodiment the ratchet is turned manually, such as with a wrench or lever. Preferably, the lever is long enough to provide a mechanical advantage to the user. This manual embodiment is advantageous because it enables the capstan winch to be operated without electrical power. Operating the capstan pulling device without power makes it especially transportable and useful for emergencies. A manual capstan winch could therefore be used to pull a vehicle from a stuck situation. For example, if a vehicle goes off an embankment in a remote location where contacting others for help or rescue is not an option, the capstan winch could be used to return the vehicle to the road.

Another embodiment enables the attachment of a drill to the drive ratchet. In some of these embodiments the drill attaches with an attachment which is similar to a wrench or socket wrench. Using a drill requires little human strength and turns the drive cylinder more quickly than a manual method such as a wrench. Many individuals carry a drill in their vehicle, whether for work, or as a matter of preparedness.

In some embodiments, tension on the line is created by line tensioners which grip the line to keep it taut. The preferred line tensioners are described in co-pending Provisional Patent Application No. 63/173,974, entitled Line Tensioner, the entirety of which is incorporated by reference. FIGS. 23-26 show the tensioners and the tensioning system which grips the line and enables tension to be kept on the line. A result of the tensioners is that as the line exits assembly 2424 it can simply spool up, as the line tensioners provide the required tension for the capstan effect. The line tensioners consist of a line gripping portion 2412, a cam follower 2414, a lever arm 2416, and a tension spring 2417. The tensioners ride along a stationary cam surface 2410. The line gripping portion 2412 is brought into and out of contact with the line 2420 as the cam follower 2416 rides along at least a portion of the cam surface 2410, the line gripping portion 2412 pressing the line 2420, providing tension, when the line gripping portion 2412 is in contact with the line 2420. The cam surface 2410 is adjacent to the drive cylinder 2432 along a C-shaped portion of the cam surface and slopes away from the winch drum along a remaining portion of the cam surface 2411, wherein the C-shaped portion pushes the cam follower 14 such that the line gripping portion 2412 contacts the line and the remaining portion 2411 brings the cam follower back such that the line gripping portion 2412 is out of contact with the line 2420. In this manner, the device is a capstan-effect winch with built-in tensioner.

In this embodiment, the cam follower 2414 is a wheel. The line gripping portion 2412 is brought out of contact with the line by a spring 2417 that pulls the line gripping portion 2412 away from the line 2420.

In some embodiments, the line tensioners consist of a first leg 2416 and a second leg 2412 joined in an L-shape. The first leg 2416 is attached adjacent to the drive cylinder 2432 at a first end of the first leg 2416 and is attached to a second end of the second leg 2412 on a second end of the first leg 2416. The line tensioners pivot about first end of the first leg 2416. The cam follower 2414 is attached to the second end of the first leg 2416. The line gripping portion 2412 is a first end of the second leg.

Figure 14:
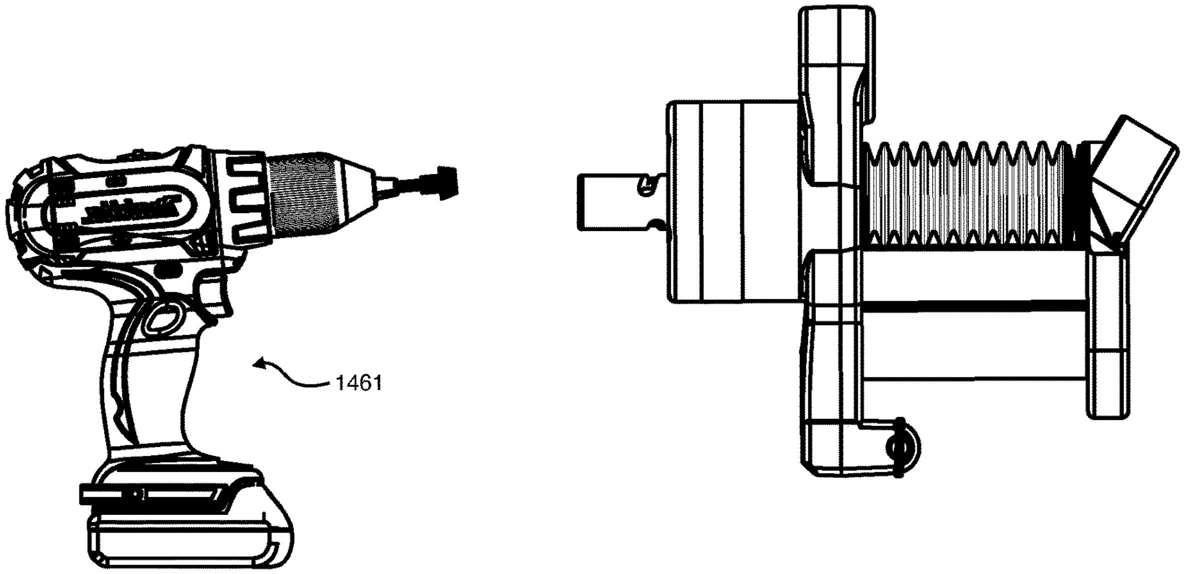
FIG. 14 is a view of a drill as a motor for rotating the rescue winch.

One of the main uses of the capstan winch is with vehicles. A traditional powered winch will be placed at the front of a vehicle. This placement is limited in its use, because the winch can only pull the vehicle in the direction the winch is pointing, this means that the winch can only pull the vehicle in direction the vehicle is pointing. The capstan winch is not limited in its placement. A line may be attached at any location on a vehicle and the capstan winch attached to the line. The winch can then be used to pull the vehicle. FIGS. 14 and 15 depict examples of vehicles needing rescue.

Figure 27:
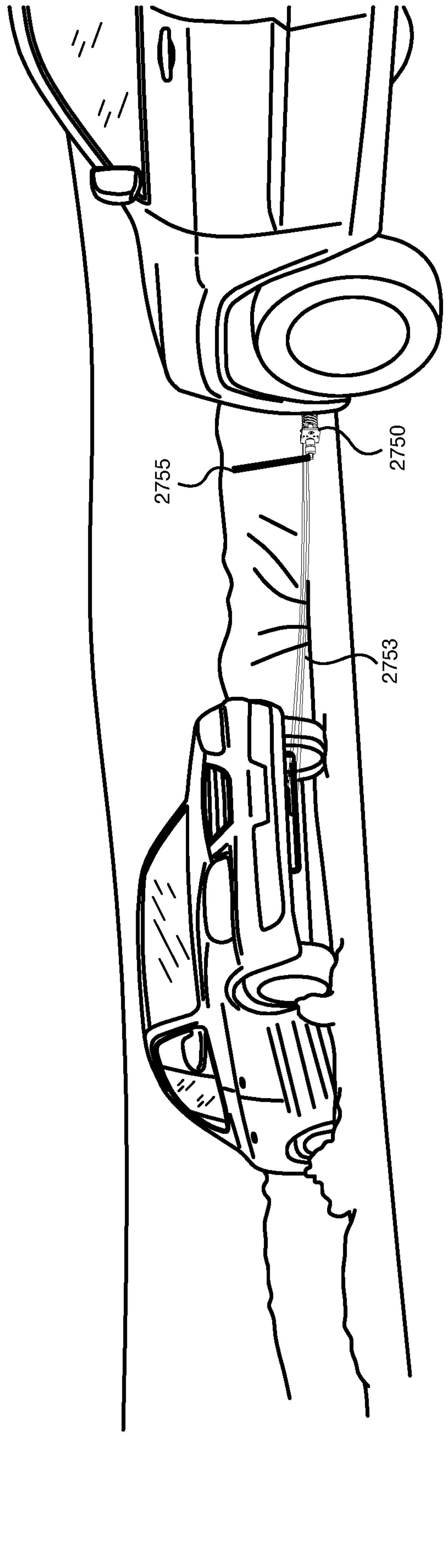
FIG. 27 is a view of a car being pulled from a ditch with the capstan winch.

FIG. 27 depicts the capstan winch 2750 being used to pull a car from a ditch. The capstan winch 2750 is attached to a truck and a line 2753 is fed into the capstan winch 2750. The line 2753 is attached to the car in the ditch. The drive cylinder is turned manually with a large lever 2755 such as a wrench. In some embodiments, the capstan winch utilizes a worm drive mechanism. In some embodiments, the capstan winch utilizes a ratchet as the drive mechanism.

Figure 28:
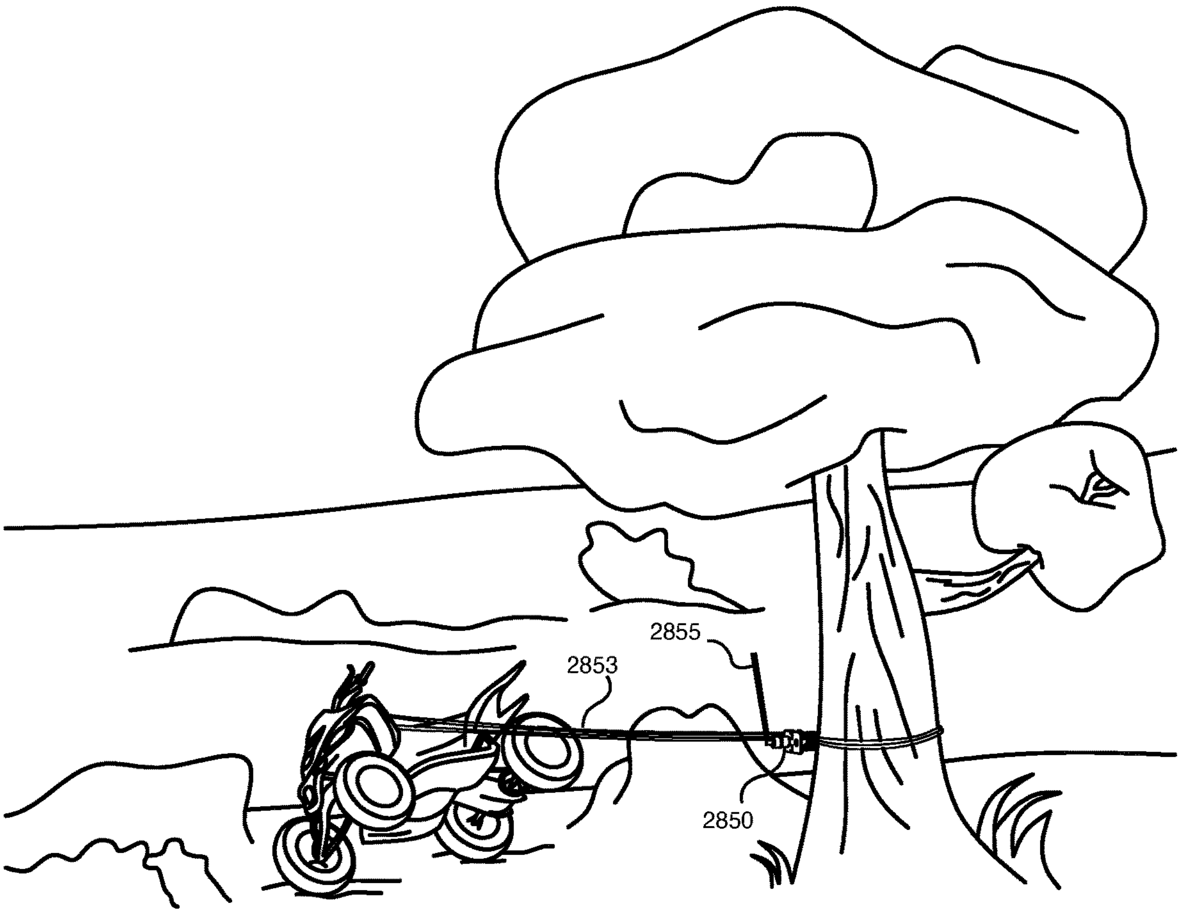
FIG. 28 is a view of an ATV being pulled to an upright position using the capstan winch.

FIG. 28 depicts the capstan winch being used to right an ATV that was overturned. The capstan winch 2850 is attached to a tree and a line 2853 is fed into the capstan winch 2850. The line 2853 is attached to the ATV. The drive cylinder is turned manually with a large lever 2855 such as a wrench. The extra length of line 2852 is free to dangle and pile up beneath the winch. The capstan winch is particularly useful for self-rescue in situations where an ATV or other vehicle is far from the possibility of receiving help from another source. The capstan winch is portable and small enough to be carried by a variety of vehicles.

Figure 29:
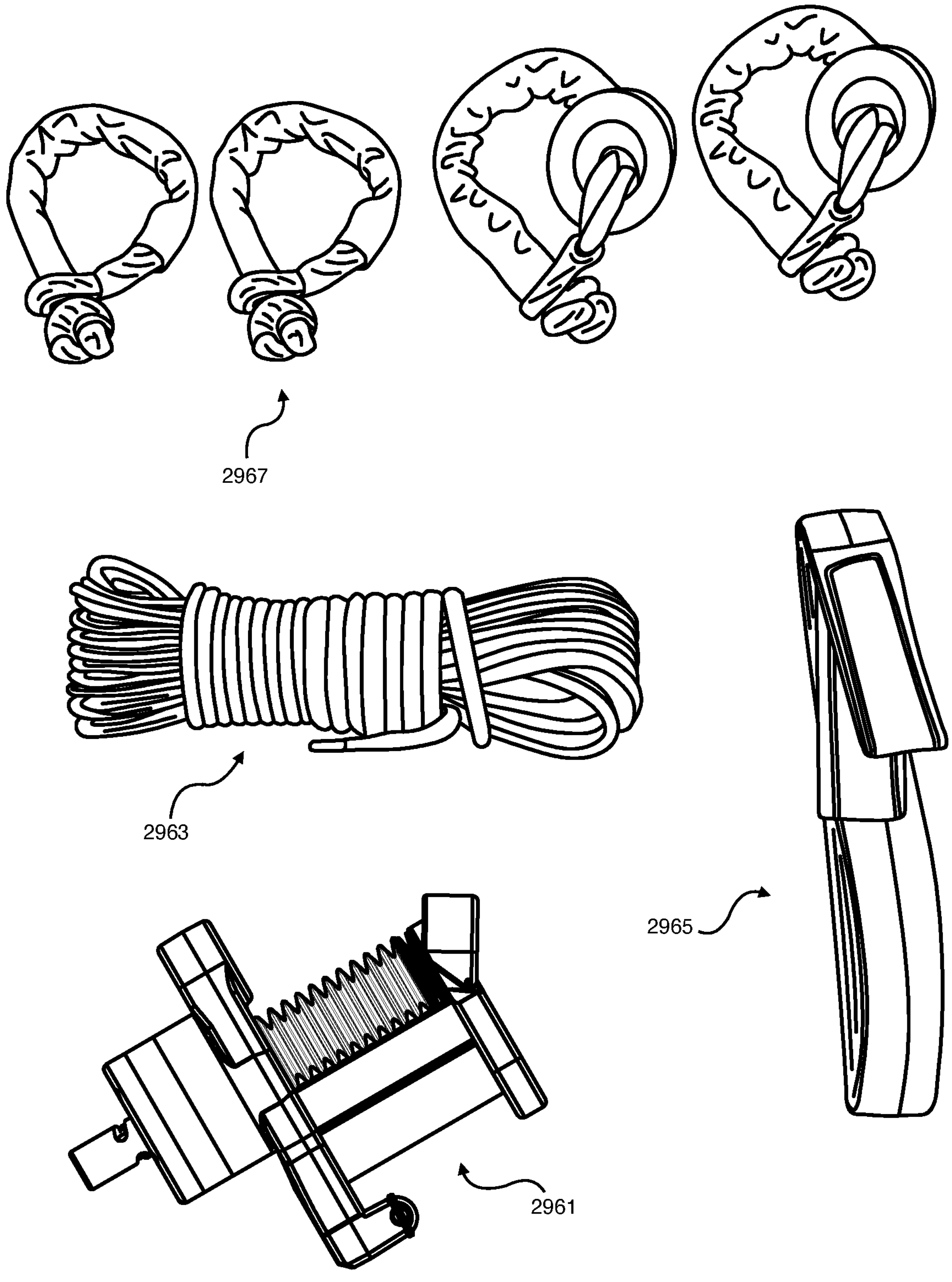
FIG. 29 is a view of a winch kit.

FIG. 29 depicts a winch kit, which includes the winch 2961 and the line 2963. The winch 2961 includes a hole 169, through which a winch attachment device, such as loops can be inserted. The loops, such as loop 2967, can then be attached around some feature of the car or truck, such as the hitch ball. The loops can also be used to attach the line to the stationary object or the object to be moved. Strap 2965 is also provided to aid in attaching to the stationary object or to the object to be moved. The line is preferably long enough for various situations. Preferably, the line is at least 50 or, more preferably, at least 100 feet long. The kit also comprises a handle for manually operating the winch. In some embodiments, the handle is a wrench. In some other embodiments, the handle is a purpose-built handle, for operating the capstan winch. In other embodiments, the handle is borrowed from other equipment on the vehicle, such as the lug wrench or jack handle.

Figure 30:
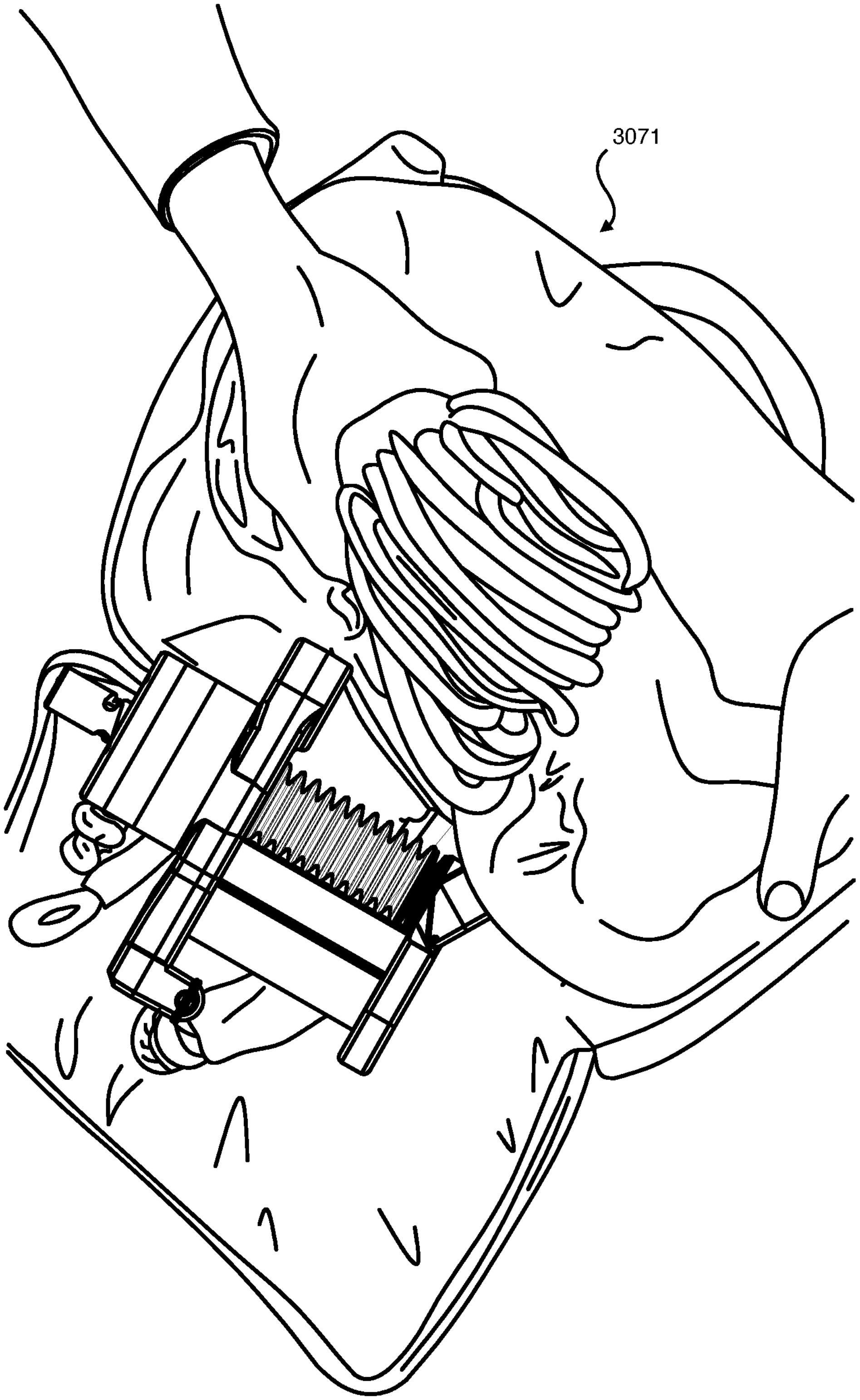
FIG. 30 is a view of a winch kit in a bag.

FIG. 30 shows the winch kit contained within a bag 3071. Preferably, all of the components shown in FIG. 29 can be fit into the bag 3071.

The invention has been described with reference to various specific and preferred embodiments and techniques. Nevertheless, it is understood that many variations and modifications may be made while remaining within the spirit and scope of the invention.

What is claimed is:

1. A portable winch comprising:

a drive cylinder, configured to be rotated by an applied force from both a handle for manually rotating the drive cylinder and from an external motor for rotating the drive cylinder about its longitudinal axis and having at least three drive grooves;

an idler with a longitudinal axis spaced apart from the longitudinal axis of the drive cylinder;

wherein a line is fed onto the winch by passing it over a first of the at least three drive grooves then around the idler and then around a second of the at least three drive grooves and then around the idler and then around a third of the at least three drive grooves;

wherein the line is attached to one of a fixed object or an object to be moved; and wherein, the winch is attached to the other of the fixed object or the object to be moved; and wherein, as the applied force is applied to the drive cylinder, the line is gripped by the at least three drive grooves and a length of the line between the fixed object and the object to be moved is shortened, whereby the object is moved.

2. The winch of claim 1, further comprising a rotation control device, which rotation control device, when engaged, permits the drive cylinder to be rotated in the direction to wind the line, but does not permit rotation in the direction to unwind the line, and which rotation control device, when disengaged permits rotation in both directions.

3. The winch of claim 2, wherein the rotation control device comprises;

a stationary portion having a frustoconical inner surface;

a movable portion having a frustoconical outer surface, adapted to engage the frustoconical inner surface, so as to stop rotation between the movable portion and the stationary portion;

a one-way rotation governor non-rotatably attached to the movable portion, non-rotatably attached to an output to and configured to allow rotation between the movable portion and the shaft in one rotational direction and prevent rotation between the movable portion and the output shaft in a second opposite rotational direction;

an input sleeve configured to transmit an applied rotation force to the device, the input sleeve also configured so that, as the input sleeve moves in a first axial direction, the moveable portion engages the stationary portion, and as the input sleeve moves in a second and opposite axial direction, the moveable portion is pushed out of engagement with the stationary portion, the input sleeve also comprising a cam slot, which cam slot, defining a path with a shape of a partial helix;

a shaft, a portion of which fits within the input sleeve;

a cam pin attached to the shaft, perpendicular to the axis of rotation of the shaft;

wherein, as the input sleeve is rotated in a winding direction, the cam pin and the cam slot cause the input sleeve to move in the first axial direction, such that moveable portion is engaged with the stationary portion;

wherein, as the input sleeve is rotated in an unwinding direction, the cam pin and the cam slot cause the input sleeve to move in the second axial direction, such that the moveable portion is pushed out of engagement with the stationary portion;

wherein, as the movable portion is engaged with the stationary portion, rotation to the output shaft is controlled by the rotation governor, such that rotation in a winding direction allows the output to be rotated in that direction and rotation is not permitted in an unwinding direction;

wherein, as the movable portion is pushed out of alignment with the stationary portion rotation by the output is allowed in an unwinding direction;

wherein as the line is pulled in a winding direction, the rotation governor allows the output shaft to rotate, and the drive cylinder rotates;

wherein as the line is pulled in an unwinding direction, the rotation governor prevents the output shaft from rotating, and the drive cylinder is prevented from rotating.

4. The winch of claim 1, further comprising an idler roller, configured to rotate about its longitudinal axis.

5. The winch of claim 4, wherein the longitudinal axis of the idler roller is at an angle to the longitudinal axis of the drive shaft.

6. The winch of claim 1, further comprising a frame to which the drive cylinder and the idler are attached.

7. The winch of claim 6, wherein the frame further comprises an attachment aperture for securing the winch to a fixed object or an object to be moved.

8. The winch of claim 6, wherein the frame further comprises a line guide.

9. The winch of claim 8, wherein the line guide comprises a quick release mechanism.

10. The winch of claim 9, wherein the quick release mechanism is a removable pin.

11. The winch of claim 1, wherein the external motor is in a handheld power drill.

12. The winch of claim 1, further comprising gripping additions on at least one of the drive grooves, for increasing friction on the line.

13. A portable winch comprising:

a drive cylinder, configured to be rotated by an applied force from both a handle for manually rotating the drive cylinder and from an external motor for rotating the drive cylinder about its longitudinal axis and having at least three drive grooves rotating in parallel planes that are perpendicular to the longitudinal axis of the drive cylinder;

a shaft parallel to the longitudinal axis of the drive cylinder upon which at least two idler pulleys are rotatably attached;

wherein the idler pulleys rotate in planes parallel to each other, which planes are at an angle to the parallel planes of the drive grooves, such that, as a line passes around a first drive groove, onto a first idler pulley, and around the first idler pulley, the line, as it comes off the first idler pulley, is aligned with a second drive groove; and wherein as the line comes around the second drive groove, onto a second idler pulley, and around the second idler pulley, the line, as it comes off the second idler pulley, is aligned with a third drive groove;

wherein the line is attached to one of a fixed object or an object to be moved; and wherein, the winch is attached to the other of the fixed object or the object to be moved; and wherein, as the line is passed around the drive grooves and idler pulleys and as the drive cylinder is rotated, the length of the line between the fixed object and the object to be moved is shortened, thereby moving the object to be moved.

14. The winch of claim 13, further comprising a frame to which the drive cylinder and the roller shaft are attached.

15. A portable winch kit comprising:

a line;

a winch comprising:

a handle;

a drive cylinder, configured to be rotated by an applied force from both the handle for manually rotating the drive cylinder and an external motor for rotating the drive cylinder about its longitudinal axis and having at least three drive grooves;

an idler with a longitudinal axis spaced apart from the longitudinal axis of the drive cylinder;

wherein the line is fed onto the winch by passing it over a first of the at least three drive grooves then around the idler and then around a second of the at least three drive grooves and then around the idler and then around a third of the at least three drive grooves;

wherein the line is attached to one of a fixed object or the object to be moved; and wherein, the winch is attached to the other of the fixed object or the object to be moved; and wherein, as the applied force is applied to the drive cylinder, the line is gripped by the at least three drive grooves and a length of the line between the fixed object and the object to be moved is shortened, whereby the object is moved;

a winch attachment device comprising a hook or a loop;

a line attachment device comprising a hook or a loop.

16. The winch kit of claim 15, wherein the handle is an extendable handle.

* * * * *